United States Patent
Hiroi

(10) Patent No.: US 11,009,894 B2
(45) Date of Patent: May 18, 2021

(54) UNMANNED FLYING DEVICE CONTROL SYSTEM, UNMANNED FLYING DEVICE CONTROL METHOD, AND INSPECTION DEVICE

(71) Applicant: NEC CORPORATION, Tokyo (JP)

(72) Inventor: Noriyoshi Hiroi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 339 days.

(21) Appl. No.: 16/088,308

(22) PCT Filed: Mar. 3, 2017

(86) PCT No.: PCT/JP2017/008572
§ 371 (c)(1),
(2) Date: Sep. 25, 2018

(87) PCT Pub. No.: WO2017/169516
PCT Pub. Date: Oct. 5, 2017

(65) Prior Publication Data
US 2019/0094888 A1    Mar. 28, 2019

(30) Foreign Application Priority Data

Mar. 28, 2016 (JP) .............................. JP2016-063652

(51) Int. Cl.
*G05D 1/00* (2006.01)
*G05D 1/10* (2006.01)
(Continued)

(52) U.S. Cl.
CPC ........... *G05D 1/106* (2019.05); *B64C 39/024* (2013.01); *G03B 21/00* (2013.01); *G05D 1/0094* (2013.01);
(Continued)

(58) Field of Classification Search
None
See application file for complete search history.

(56) References Cited

U.S. PATENT DOCUMENTS 9,674,504 B1 *   6/2017   Salvagnini ........... G06K 9/4604
2017/0134631 A1 * 5/2017   Zhao .................... G05D 1/0094

FOREIGN PATENT DOCUMENTS

| JP | 2002-082720 A | 3/2002 |
| JP | 2014-062789 A | 4/2014 |
| JP | 2016-015628 A | 1/2016 |

OTHER PUBLICATIONS

International Search Report for PCT/JP2017/008572 dated Apr. 11, 2017 [PCT/ISA/210].

\* cited by examiner

*Primary Examiner* — James M McPherson

(57) ABSTRACT

An image projection unit projects, onto an object, an image that contains identification information for identifying the contents of control on an unmanned flying device. A control unit controls operation of the unmanned flying device, in accordance with the identification information indicated by the image captured by the imaging device mounted on the unmanned flying device. A deformation determination unit determines deformation of the projection plane of the object. The image projection unit projects an image showing a predetermined shape onto the object, and, in accordance with a result of the deformation determination, controls projection of the image for controlling operation of the unmanned flying device. The deformation determination unit determines deformation of the projection plane, in accordance with the shape of the captured image generated by capturing the projected image showing the predetermined shape.

10 Claims, 15 Drawing Sheets

(51) Int. Cl.
*H04N 9/31* (2006.01)
*G03B 21/00* (2006.01)
*B64C 39/02* (2006.01)
*G06T 7/60* (2017.01)
*H04N 7/18* (2006.01)

(52) U.S. Cl.
CPC ............... *G06T 7/60* (2013.01); *H04N 7/185* (2013.01); *H04N 9/3182* (2013.01); *H04N 9/3185* (2013.01); *H04N 9/3194* (2013.01); *B64C 2201/127* (2013.01); *B64C 2201/141* (2013.01)

FIG. 4

| EXAMPLE INFORMATION IMAGE SYMBOL | SYMBOL | MEANING |
|---|---|---|
| MOVING DIRECTION | ⬇ | DOWNWARD ARROW, INDICATING DOWNWARD MOVEMENT |
| SPEED ADJUSTMENT | ⬇ | INDICATING FLIGHT SPEED WITH CHANGES IN SHADING OF COLOR OF ARROW |
| STAY INSTRUCTION | ⬇ | BAR ATTACHED TO END PORTION, INDICATING AERIAL VEHICLE'S STAY IN AIR |
| ORIENTATION OF CAMERA | ↺ | U-SHAPED ROTATION ARROW, ELEVATION ANGLE OF CAMERA BEING DIRECTED UPWARD, HORIZONTAL ANGLE BEING FIXED |
| ATTITUDE ADJUSTMENT | ⌒ | CONTROL ON ATTITUDE OF AERIAL VEHICLE, AND HORIZONTAL ATTITUDE CONTROL |

FIG. 5

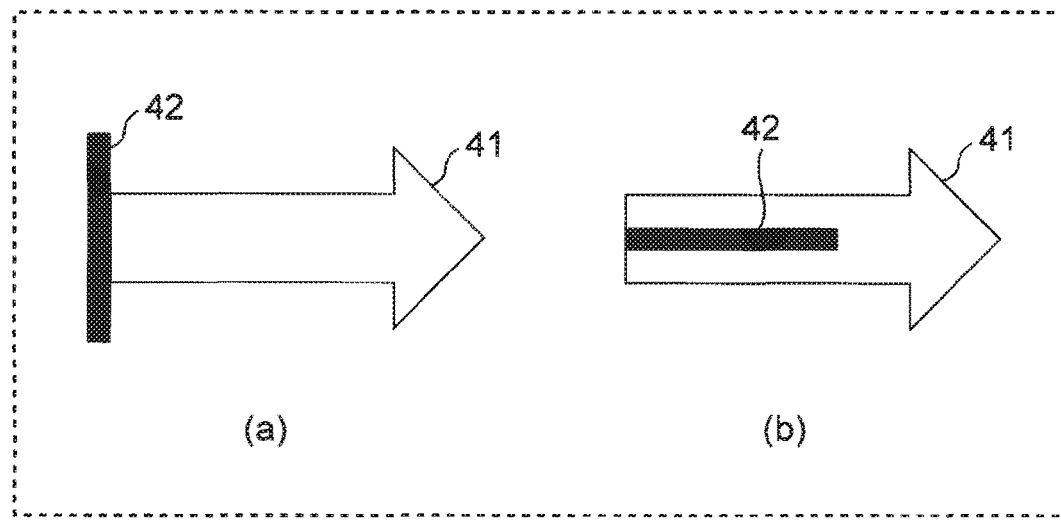

(a)     (b)

FIG. 12
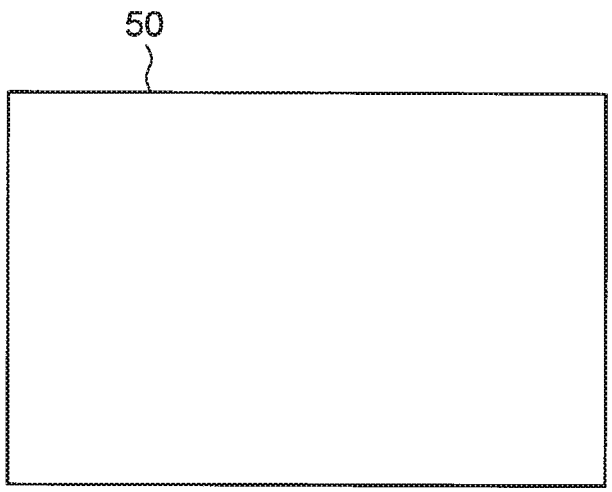
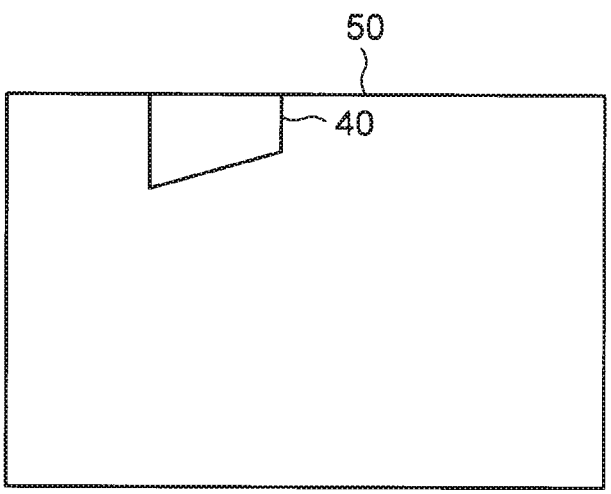
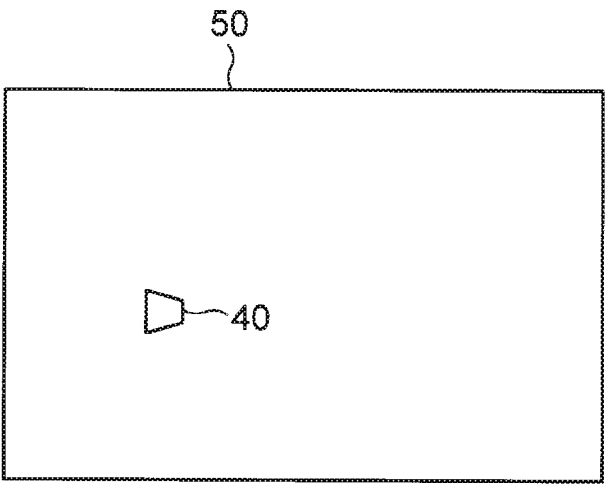

UNMANNED FLYING DEVICE CONTROL SYSTEM, UNMANNED FLYING DEVICE CONTROL METHOD, AND INSPECTION DEVICE

CROSS REFERENCE TO RELATED APPLICATIONS

This application is a National Stage of International Application No. PCT/JP2017/008572, filed on Mar. 3, 2017, which claims priority from Japanese Patent Application No. 2016-063652, filed on Mar. 28, 2016, the disclosures of which are incorporated herein in their entirety.

TECHNICAL FIELD

The present invention relates to an unmanned flying device control system that controls an unmanned flying device, an unmanned flying device control method, and an inspection device that can be used in the unmanned flying device control system.

BACKGROUND ART

Building state inspection (infrastructure deterioration diagnosis) using an unmanned aerial vehicle is conducted these days. For example, the deterioration state of a building can be estimated from the condition of a surface of a building imaged by a camera mounted on an unmanned aerial vehicle. Hereinafter, an unmanned aerial vehicle will be referred to as an UAV. Note that an UAV can also be referred to as an unmanned flying device.

To use an UAV in infrastructure deterioration diagnosis, control needs to be performed to guide the UAV to the vicinity of the building to be diagnosed.

According to a conventional technology, the control unit of an UAV checks the position of the UAV through a global positioning system (GPS) signal, to guide the UAV to a target position. Patent Literature 1 discloses an aerial photography apparatus equipped with a camera that includes a GPS device having a GPS antenna, and an imaging unit.

CITATION LIST

Patent Literature

PTL 1: Japanese Patent Application Laid-Open No. 2014-62789

SUMMARY OF INVENTION

Technical Problem

In a case where infrastructure deterioration diagnosis is conducted with an UAV that checks positions through GPS signals, the problems described below are caused. In a GPS that has a single antenna attached to a moving object such as an UAV, real-time positioning accuracy has an error of several meters. As a result, when the UAV approaches the building to be subjected to infrastructure deterioration diagnosis, the distance between the building and the UAV might become too long or too short, because the GPS measurement position error of the UAV is large. Depending on the positional relationship between the UAV and the GPS satellite, there is also a possibility that the UAV will pass through a place where the GPS signal intensity is low. In a case where the UAV passes through a place where the GPS signal intensity is low, the UAV cannot accurately recognize the position of the UAV, and the accuracy of guiding the UAV to a target position becomes lower.

To solve this problem with a simple configuration, it is possible to take the following measures: an image for controlling operation of the UAV is projected onto an object such as a building, an image of the projected image is captured by a camera mounted on the UAV, and thus, the UAV is guided to the vicinity of a target position located near the object.

In the UAV guidance control based on such an image, if the image projection plane of the object is deformed due to defects such as cracking, bulging, or the like caused in the projection plane, the projected image is distorted, and UAV control based on the image might not be performed correctly in some cases.

Note that such a problem can be caused not only in the UAV control in infrastructure deterioration diagnosis but also in other UAV control for guiding an UAV to a target position located near the object, such as patrolling and monitoring of the building.

In view of the above, the present invention aims to provide an unmanned flying device control system capable of controlling an unmanned flying device by taking into account the state of the image projection plane of the object, an unmanned flying device control method, and an inspection device that can be used in the unmanned flying device control system, in a case where an image for controlling operation of the unmanned flying device is projected onto the object, and the unmanned flying device is guided to the vicinity of a target position located near the object.

Solution to Problem

An unmanned flying device control system according to the present invention includes: an image projection unit that projects an image onto an object, the image being designed for controlling operation of an unmanned flying device equipped with an imaging device; a control unit that controls operation of the unmanned flying device, in accordance with the image captured by the imaging device; and a deformation determination unit that determines deformation of a projection plane of the object. The image projection unit projects an image showing a predetermined shape onto the object, and controls projection of the image for controlling operation of the unmanned flying device, in accordance with a result of the deformation determination. The deformation determination unit determines deformation of the projection plane, in accordance with the shape of a captured image generated by capturing the projected image showing the predetermined shape.

Also, an unmanned flying device control method according to the present invention includes: projecting an image showing a predetermined shape onto an object; determining deformation of a projection plane, in accordance with the shape of a captured image generated by capturing the projected image showing the predetermined shape; controlling projection of an image for controlling operation of an unmanned flying device equipped with an imaging device, in accordance with a result of the deformation determination; projecting the image for controlling operation of the unmanned flying device onto the object; and controlling operation of the unmanned flying device, in accordance with the image captured by the imaging device.

Further, an inspection device according to the present invention includes: an image projection unit that projects an image showing a predetermined shape onto an object, an image for controlling an unmanned flying device equipped with an imaging device being to be projected onto the object; and a deformation determination unit that determines deformation of a projection plane, in accordance with the shape of a captured image generated by capturing the projected image showing the predetermined shape.

Advantageous Effects of Invention

According to the present invention, in a case where an image for controlling operation of an unmanned flying device is projected onto the object, and the unmanned flying device is guided to the vicinity of a target position located near the object, it is possible to control the unmanned flying device by taking into consideration the state of the image projection plane of the object.

BRIEF DESCRIPTION OF DRAWINGS

FIG. 4 It depicts an explanatory diagram showing the meanings of the symbols in the example information image shown in FIG. 3.

FIG. 5 It depicts an explanatory diagram showing examples of display forms of a bar.

FIG. 12 It depicts a schematic diagram showing examples of camera images in which the information image cannot be recognized.

DESCRIPTION OF EMBODIMENTS

The following is a description of exemplary embodiments of the present invention, with reference to the drawings.

First Exemplary Embodiment

Figure 1:
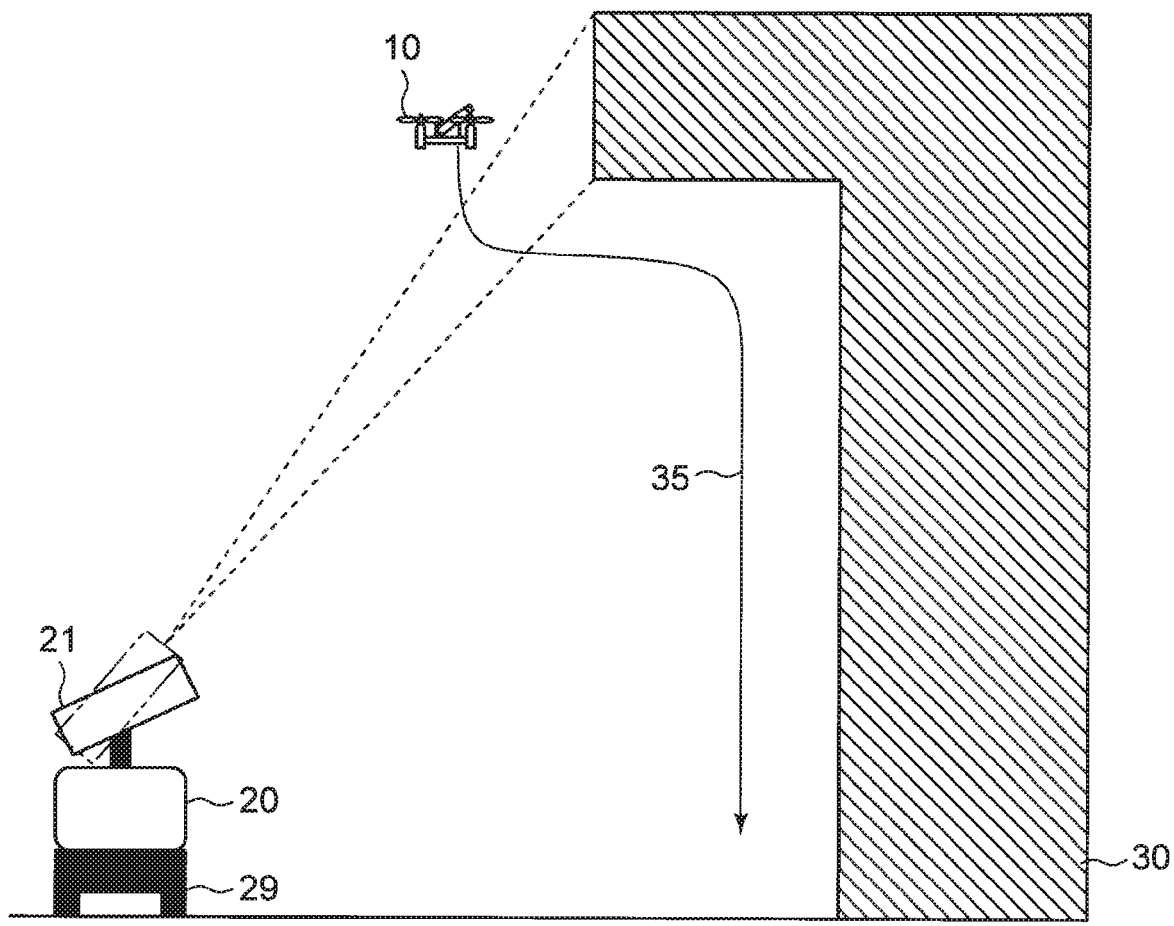
FIG. 1 It depicts a schematic diagram showing an unmanned flying device control system of the present invention and a building to be inspected.

FIG. 1 is a schematic diagram showing an unmanned flying device control system of the present invention and a building to be inspected. The unmanned flying device control system of the present invention includes an unmanned aerial vehicle (hereinafter referred to as UAV) 10 and a projection station 20. As mentioned above, an UAV may also be referred to as an unmanned flying device.

The UAV 10 is equipped with a camera. The camera mounted on the UAV 10 images a surface of the building 30 to be inspected, and generates an image of the surface of the building. With this image, it is possible to inspect the state of the building (infrastructure deterioration diagnosis).

The projection station 20 includes a projector 21, and projects an image (hereinafter referred to as an information image) containing information indicating the specific control on the UAV 10, from the projector 21 onto the surface of the building 30. The projection station 20 is mounted on a vehicle 29, and can move or remain at the same place.

The projection station 20 stores information about the external appearance and the three-dimensional shape of the building 30 to be inspected. The projection station 20 further recognizes the positional relationship between the projection station 20 and the building 30. The positional relationship between the projection station 20 and the building 30 is measured with various measurement devices (not shown), and not only the position but also the orientation in a three-dimensional space is measured with high precision. The method of obtaining the three-dimensional shape of the building 30 may be a method that uses design drawings or three-dimensional computer-aided design (3D-CAD) data, or a method of measuring the object beforehand by three-dimensional light detection and ranging (3D-LiDAR) or the like. Meanwhile, the information about the three-dimensional shape of the building 30 is not necessarily information about the entire building 30, but may be information about part of the building 30 to be observed according to the present invention. As for the method of obtaining the positional relationship between the building 30 and the projection station 20 with high precision, there are many well-known methods such as triangulation using a total station or the like, and therefore, explanation thereof is not made herein. The positional relationship between the projection station 20 and the building 30 is basically measured in advance. However, in a case where there is a possibility that the building 30 will be deformed during the operation due to the influence of wind or the like, or where the projection station 20 is in an unstable position on a ship or the like, the positional relationship may be measured during the operation according to the present invention.

In accordance with the positional relationship and the stored information, the projection station 20 sets information image projection portions on the surface of the building 30, and derives a path 35 for the UAV 10. The projection station 20 also generates information images to be projected the respective projection portions. The projection station 20 further determines the position for the UAV 10 to capture the information images (the position will be hereinafter referred to as the target position), the attitude (inclination or orientation) at the target position, and the orientation of the camera. This attitude and the orientation of the camera are the attitude and the orientation of the camera at the time of capturing the information images. The projection station 20 generates the contents of the control of movement to the next target position, and an information image for instructing the attitude and the orientation of the camera at the time of movement, for example, in accordance with the positional relationship between the target positions. The information image also includes information for instructing the UAV 10 to capture an image for state inspection. The projection station 20 sequentially projects information images onto the surface of the building 30. As will be described later, in practice, the UAV 10 generally captures an information image at a position deviated from the target position, and the attitude at the time of capturing the information image and the orientation of the camera are not necessarily predetermined attitudes.

The UAV 10 captures an image the surface of the building 30 on which an information image is projected by the camera. Hereinafter, an image obtained by imaging performed by the camera of the UAV 10 will be referred to as a camera image. The UAV 10 operates in accordance with the control contents indicated by the information image in the camera image (or the information image shown in the camera image). For example, in accordance with the information image in the camera image, the UAV 10 performs imaging for state inspection, or moves toward the next target position.

The UAV 10 operates in accordance with the information image in the camera image, and captures an image the surface of the building 30 for state inspection while moving in the vicinity of the path 35.

The UAV 10 does not always capture an information image at a target position in the path 35. As the UAV 10 is affected by various factors such as wind, it is normally difficult for the UAV 10 to reach the same position as a predetermined target position. Therefore, when the UAV 10 reaches the vicinity of a target position, the UAV 10 captures an image of the surface of the building 30. In accordance with the resultant camera image, the UAV 10 calculates the difference between the position and the target position. The UAV 10 then derives the contents of the control for moving from the current position to the next target position, in accordance with the movement control contents indicated by the information image in the camera image and the calculated difference.

Figure 2:
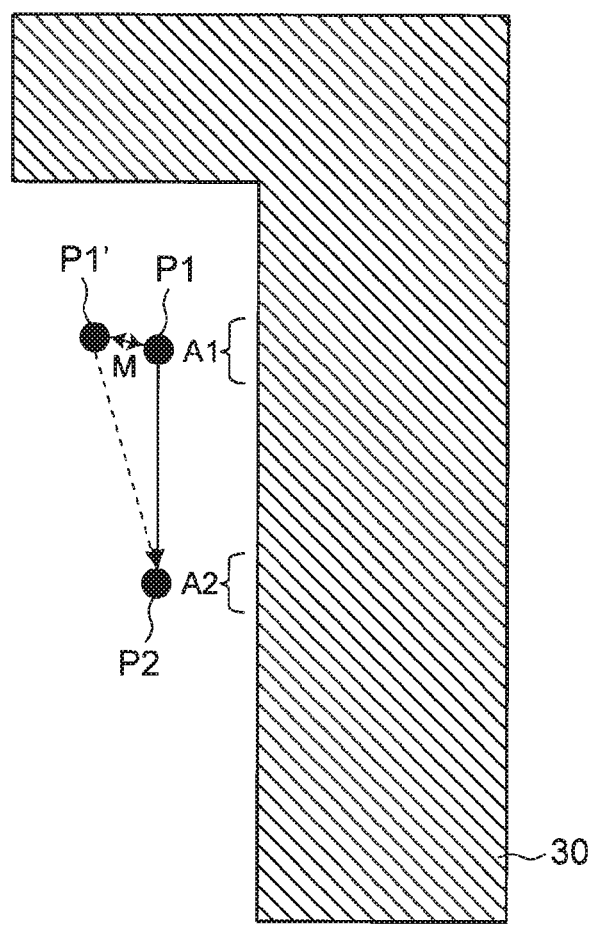
FIG. 2 It depicts a schematic diagram showing a situation where an UAV grasps the contents of the control of movement to the next target position in a case where the UAV performs imaging at a position deviated from the current target position.

FIG. 2 is a schematic diagram showing a situation where the UAV 10 grasps the contents of the control of movement to the next target position in a case where the UAV 10 performs imaging at a position deviated from the target position. In the example shown in FIG. 2, regions A1 and A2 on the surface of the building 30 are information image projection portions. It is also assumed that a target position P1 is set as the position for capturing an image of the information image projected onto the region A1. Likewise, it is assumed that a target position P2 is set as the position for capturing an image of the information image projected onto the region A2. The attitudes of the UAV 10 and the orientations of the camera at the respective target positions P1 and P2 are also set. As described above, since the UAV 10 is affected by various factors such as wind, it is difficult for the UAV 10 to capture an image of the information image projected onto the region A1 at a position that completely matches the target position P1. Therefore, the UAV 10 captures an image of the information image projected onto the region A1 at a position P1' near the target position P1. At this point, the attitude of the UAV 10 and the orientation of the camera are normally different from the attitude and the orientation of the camera at the predetermined target position P1.

The UAV 10 calculates the difference M between the target position P1 and the position P1' (see FIG. 2), in accordance with the contour of the information image in the camera image in a case where it is assumed that an image of the information image projected onto the region A1 is captured with a predetermined attitude and a predetermined orientation of the camera at the target position P1, and the contour of the information image in the camera image obtained by actually capturing an image of the information image at the position P1'. The information image projected onto the region A1 shows the movement control contents for moving from the target position P1 to the target position P2. In accordance with the movement control contents and the calculated difference M, the UAV 10 derives the control contents for moving from the position P1' to the target position P2. In accordance with the control contents, the UAV 10 moves toward the next target position P2. In a case where an image of the information image projected onto the region A2, the UAV 10 also captures an image of the information image in the vicinity of the target position P2, and also derives the control contents for moving to the next target position.

Note that the information about the contour of the information image in the camera image in a case where it is assumed that the information image has been taken with a predetermined attitude and a predetermined orientation of the camera at a predetermined target position is given to the UAV 10 in advance.

Further, the UAV 10 normally cannot capture an image of an information image from a position in front of the information image, due to various influence factors such as wind. Therefore, a camera image normally shows a distorted information image. After performing a process of removing the distortion of the information image, the UAV 10 recognizes the control contents indicated by the information image in the camera image.

Figure 3:
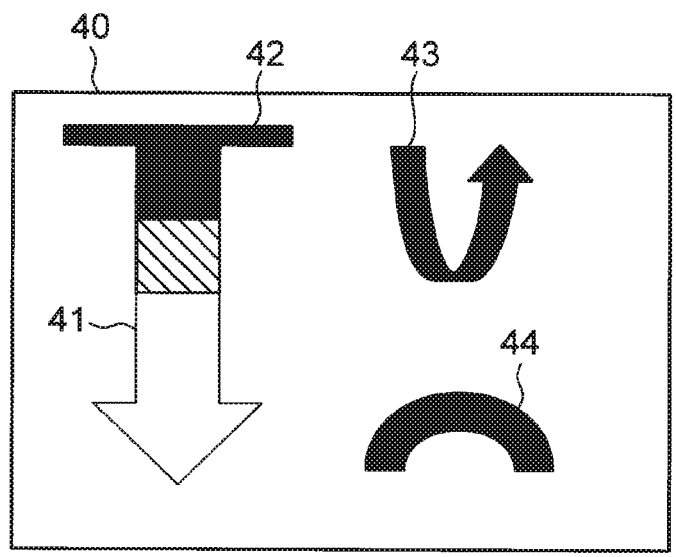
FIG. 3 It depicts an explanatory diagram showing an example of an information image.

FIG. 3 is an explanatory diagram showing an example of an information image projected by the projection station 20. FIG. 4 is an explanatory diagram showing the meanings of the symbols in the information image shown as an example in FIG. 3.

An information image 40 includes a movement control symbol 41, a camera orientation control symbol 43, and an attitude control symbol 44, for example.

The movement control symbol 41 is a symbol indicating the contents of control relating to movement of the UAV 10. With the movement control symbol 41, it is possible to designate a moving direction, a stay in the air, and a velocity. The movement control symbol 41 shown as an example in FIG. 3 has the shape of an arrow, and the direction indicated by the arrow is the designated moving direction. In the example shown in FIG. 3, downward movement is designated. The moving direction designated by the movement control symbol 41 is not necessarily a downward direction.

The movement control symbol 41 can also instruct the UAV 10 to stay in the air with an added bar 42. The bar 42 means an instruction to stay in the air. In a case where the bar 42 is provided at the end portion on the opposite side from the arrowhead of the movement control symbol 41, the bar 42 means movement in the direction of the arrow (downward in this example) after a stay in the air. Alternatively, it is possible to issue a stay instruction after movement, by displaying the bar 42 at the end portion on the arrowhead side of the movement control symbol 41. In the description below, for ease of explanation, the UAV 10 recognizes the control contents indicated by the information image 40, stays in the air, captures an image for state inspection within the time of the stay, and then moves in the designated direction. In this case, the bar 42 is displayed at the end portion on the opposite side from the arrowhead. Further, in the description below, the bar 42 also means an instruction for imaging for state inspection during the stay in the air.

The movement control symbol 41 also indicates the moving velocity when the UAV 10 moves, depending on how the color shading inside the movement control symbol 41 (the arrow-shaped symbol) changes. In FIG. 3 and FIG. 4, changes in shading of the color of the arrow-shaped symbol are represented by changes in patterns for the sake of convenience. The shading of the color in the actual arrow shape may change in a gradual manner, for example.

Note that the orientation of the bar 42 is set perpendicular to the orientation of the arrow, for example. However, the orientation of the bar 42 is not necessarily set as in this example, and may be always horizontal, for example. FIG. 5 is an explanatory diagram showing examples of display forms of the bar 42. In FIG. 5, display of the color shading in the movement control symbol 41 is not shown. FIG. 5(a) shows an example case where the orientation of the bar 42 is set perpendicular to the direction of the arrow. FIG. 5(b) shows an example case where the orientation of the bar 42 is always set horizontal. In a case where the arrow extends rightward as shown in the example in FIG. 5, the bar 42 is set as a vertical bar in the example shown in FIG. 5(a). In the example shown in FIG. 5(b), on the other hand, the bar 42 is horizontal and is shown inside the arrow.

The camera orientation control symbol 43 is a symbol indicating the contents of control relating to the orientation of the camera mounted on the UAV 10. With the camera orientation control symbol 43, the elevation angle and the horizontal angle of the camera are controlled. FIG. 3 shows an example case where the camera orientation control symbol 43 is a U-shaped rotation arrow. In this example, a U-shaped rotation arrow means that the elevation angle of the camera is directed upward, and the horizontal angle is fixed. The correspondence relationship between the contents of control relating to the orientation of the camera and the shape of the camera orientation control symbol 43 is set in advance.

It should be noted that, in a case where the orientation of the camera being moved to the next target position and the orientation of the camera at the time of the imaging corresponding to the next target position are defined independently of each other, the projection station 20 may incorporate the camera orientation control symbols corresponding to the respective orientations into the information image 40.

The attitude control symbol 44 is a symbol indicating the contents of control relating to the attitude of the UAV 10. FIG. 3 shows an example case where the attitude control symbol 44 has a semicircular shape. In this example, a semicircular shape means that the attitude of the UAV 10 is controlled to be horizontal. The relationship between the contents of control relating to the attitude of the UAV 10 and the shape of the attitude control symbol 44 is set in advance.

It should be noted that, in a case where the attitude during movement to the next target position and the attitude at the time of the imaging corresponding to the next target position are defined independently of each other, the projection station 20 may incorporate the attitude control symbols corresponding to the respective attitudes into the information image 40.

Although not shown in FIG. 3, the information image 40 may also include information indicating the contour of the information image in the camera image in a case where an image of the information image is captured at a certain target position with an attitude and a camera orientation determined in accordance with the target position. Hereinafter, the information indicating the contour of the information image in the camera image in a case where an image of the information image is captured at a certain target position with an attitude and a camera orientation determined in accordance with the target position will be referred to as the contour information.

The movement control symbol 41, the bar 42, the camera orientation control symbol 43, and the attitude control symbol 44 are identification information for identifying the contents of the control of the UAV 10, and it is safe to say that the information image 40 is an image containing such identification information. FIG. 3 also shows an example case where the identification information (the movement control symbol 41, the bar 42, the camera orientation control symbol 43, and the attitude control symbol 44) for identifying the control contents is represented by graphical symbols. As shown in the example in FIG. 3, the identification information for identifying the control contents is represented by graphical symbols or the like, so that the inspection operator can visually recognize the identification information with ease even from afar.

Alternatively, the identification information for identifying the contents of the control of the UAV 10 may be a symbol such as a QR code (registered trademark) or a bar code.

The identification information for identifying the contents of the control of the UAV 10 may also be symbols such as Chinese characters, numbers, or hieroglyphs.

Further, the identification information for identifying the contents of the control of the UAV 10 may be a phrase such as "1-meter flight after staying for 30 seconds", for example.

From the viewpoint of viewability of the inspection operator, the projection station 20 may project the information image 40 in such a manner that the information in the information image 40 (the identification information for identifying the control contents) appears to be blinking. As the information image 40 is projected in this manner, the contents of the information image 40 can be made conspicuous, and the inspection operator can easily recognize the contents.

Further, the projection station 20 may incorporate other information into the information image 40, in addition to the identification information for identifying the control contents. For example, the projection station 20 may incorporate state information (such as the current altitude of the UAV 10 and the step number indicating the progress of the operation, for example) into the information image 40.

The above mentioned contour information is used in obtaining the difference M between the target position P1 and the actual position P1'. The information necessary for obtaining the difference M between the target position P1 and the actual position P1' may not be the above mentioned contour information. The projection station 20 may incorporate the information necessary for obtaining the difference M between the target position P1 and the actual position P1' into the information image 40, and the UAV 10 may store the information in advance. For example, the projection station 20 may project an information image 40 including special icons at the four corners, instead of the contour information, and the UAV 10 may calculate the difference M from the positional relationship among those icons captured in a camera image. As a shape that is easy to recognize is used as above without the use of any contour, the possibility that the UAV 10 will miscalculate the difference M can be reduced.

Further, the projection station 20 may incorporate the information necessary for obtaining the difference M between the target position P1 and the actual position P1', into the information image 40 in a fixed manner. For example, an inspection zone number (not shown) indicating the inspection zone is included in the information image 40. The projection station 20 may fixedly determine the first half of the inspection zone number with alphabets or the like, for example, and freely determine the latter half. The UAV 10 may calculate the difference M from deformation of the fixed part in the camera image. In this manner, part of the information image 40 is fixedly determined, and the difference M is calculated in accordance with the image of the portion in the camera image. In this manner, the elements in the information image 40 for calculating the difference M can be prevented from hindering the operation of the inspection operator.

Figure 6:
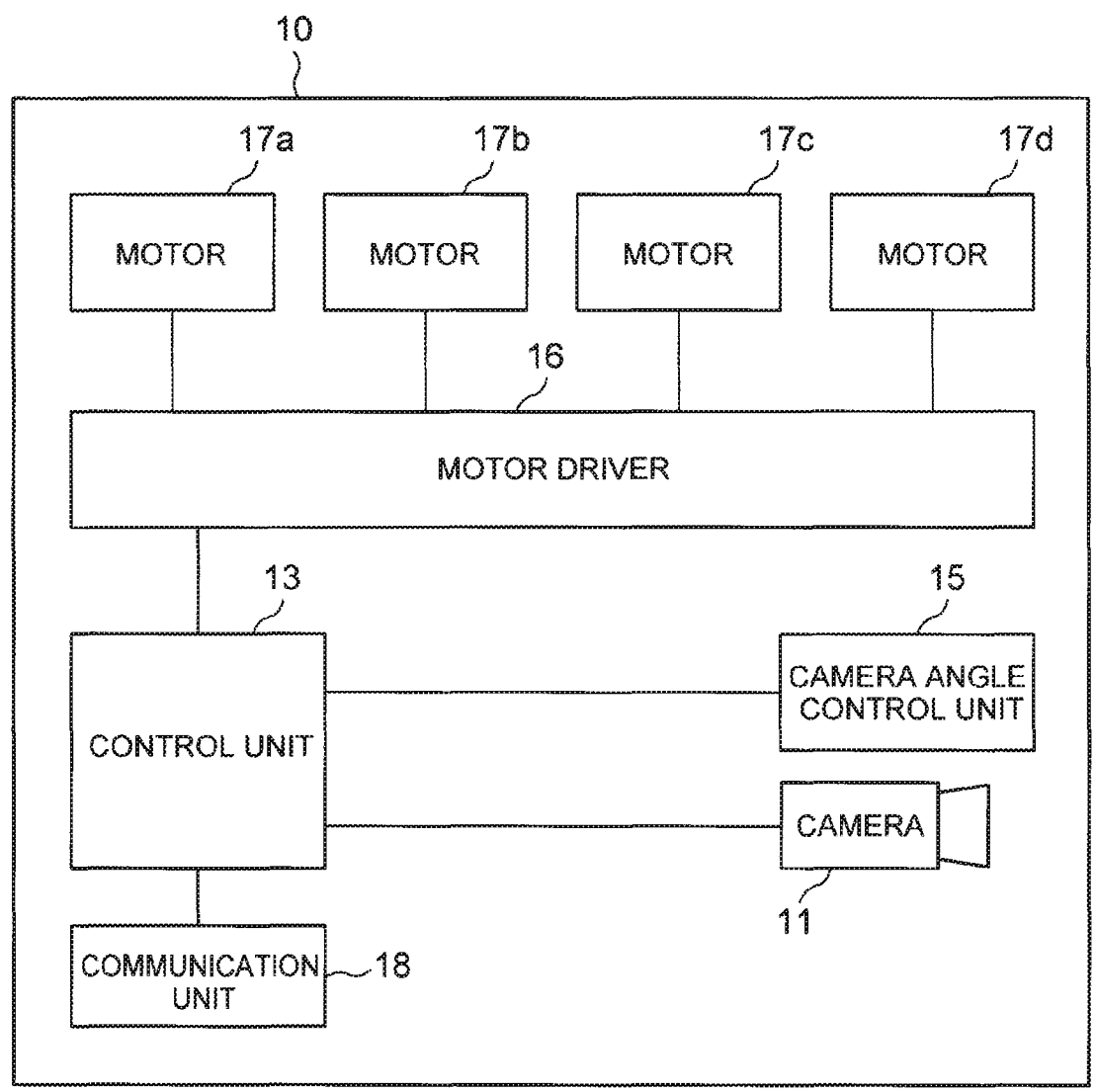
FIG. 6 It depicts a block diagram showing an example configuration of the UAV.

Next, an example configuration of the UAV 10 is described. FIG. 6 is a block diagram showing an example configuration of the UAV 10. This example described below is an example case where the UAV 10 has four propellers (not shown in FIG. 6), and four motors in one-to-one correspondence with the four propellers. However, the number of the propellers and the motors is not limited to the above example.

The UAV 10 includes a camera 11, a control unit 13, a camera angle control unit 15, a motor driver 16, four motors 17a through 17d, and a communication unit 18.

The camera 11 captures an image of a surface of the building 30 (see FIG. 1) to be inspected for infrastructure deterioration diagnosis, and generates a camera image showing the surface of the building. In a case where an information image is projected within the field of view of the camera, the information image is also shown in the camera image. The camera 11 inputs the generated camera image to the control unit 13. The orientation of the camera 11 can be controlled.

The field of view of the camera on the surface of the building 30 (see FIG. 1) and the camera image obtained by capturing an image of the field of view are now described.

Figure 7:
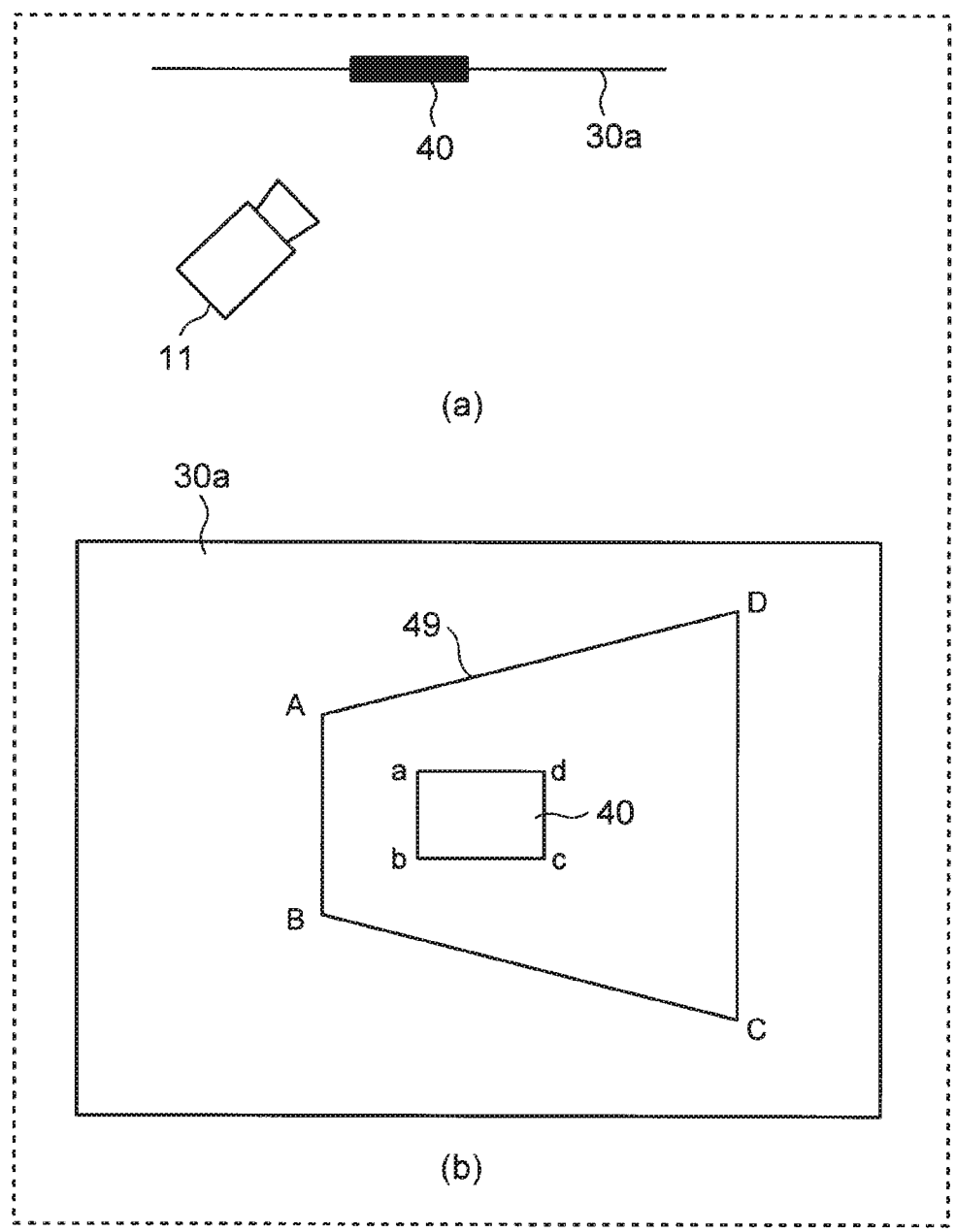
FIG. 7 It depicts a schematic diagram showing an example of the field of view of a camera.

FIG. 7 is a schematic diagram showing an example of the field of view of the camera on the surface of the building 30 (see FIG. 1). FIG. 7(a) is a schematic top view showing an example situation where the camera 11 of the UAV 10 (not shown in FIG. 7) captures an image of a surface 30a of the building 30. Further, the information image 40 is projected on the surface 30a of the building 30. It is difficult for the camera 11 to capture an image of the surface 30a from a position on the completely opposite side from the surface 30a of the building 30, due to the influence of wind or the like. Therefore, as shown in FIG. 7(a), the camera 11 normally captures an image the surface 30a of the building 30 from an oblique direction. FIG. 7(b) is a schematic diagram showing the field of view of the camera 11 on the surface 30a of the building 30 in the state shown in FIG. 7(a). The field of view 49 of the camera 11 on the surface 30a has a rectangular shape. The example shown in FIG. 7(b) is an example case where the field of view 49 turns into a trapezoid, because the camera 11 captures an image of the surface 30a of the building 30 from an oblique direction. The field of view 49 does not necessarily turn into a trapezoidal shape. However, the field of view 49 of the camera 11 becomes rectangular in a case where the camera faces the surface 30a of the building 30 from a position in front of the surface 30a, and the field of view 49 does not become rectangular in a case where the camera 11 captures an image of the surface 30a of the building 30 from an oblique direction as shown in FIG. 7(a). Meanwhile, the projection station 20 projects the information image 40 onto the surface 30a so that the information image 40 becomes rectangular on the surface 30a. Accordingly, the information image 40 projected onto the surface 30a has a rectangular shape. The vertices of the field of view 49 are represented by A, B, C, and D. The vertices of the information image 40 projected onto the surface 30a of the building 30 are represented by a, b, c, and d. It should be noted that, in FIG. 7(b), the various symbols in the information image 40 are not shown. The same applies in FIG. 8 and others.

Figure 8:
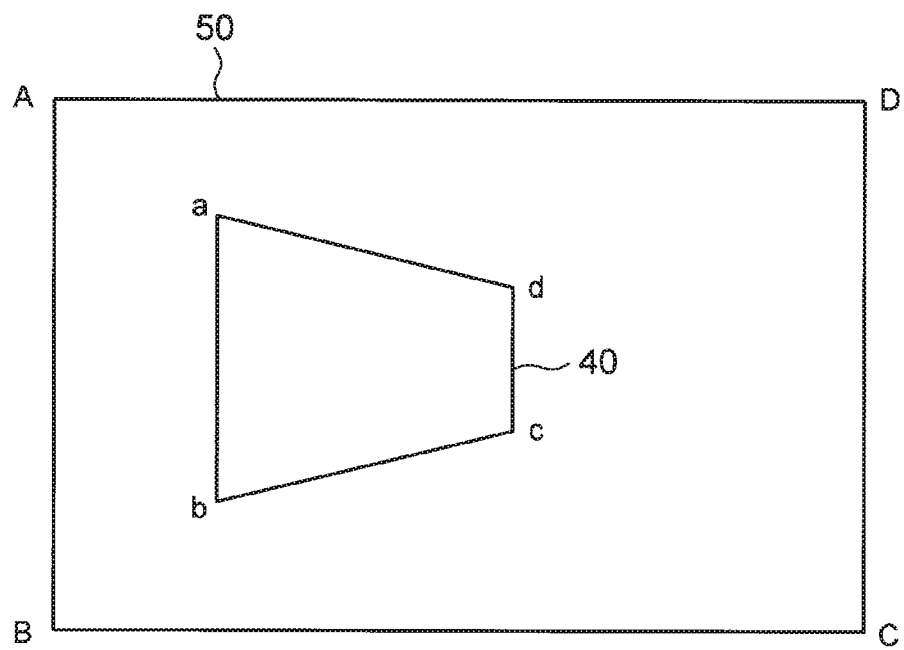
FIG. 8 It depicts a schematic diagram showing an example of a camera image generated by capturing an image of the field of view shown in FIG. 7(b).

The camera 11 captures an image of the field of view 49, to generate a camera image. FIG. 8 is a schematic diagram showing an example of a camera image generated by capturing an image of the field of view 49 shown in FIG. 7(b). The camera image 50 has a rectangular shape. The vertices of the camera image 50 correspond to the respective vertices of the field of view 49 shown in FIG. 7(b). The vertex of the camera image 50 corresponding to the vertex A of the field of view 49 is also denoted by reference sign A. The same applies to the other vertices of the camera image. Likewise, the vertices of the information image 40 (see FIG. 8) shown in the camera image 50 correspond to the respective vertices of the information image 40 (see FIG. 7(b)) projected onto the surface 30a of the building 30. The vertex of the information image 40 (see FIG. 8) shown in the camera image 50 corresponding to the vertex a of the information image 40 shown in FIG. 7(b) is also denoted by reference sign a. The same applies to the other vertices of the information image 40 in the camera image 50. Hereinafter, the contour of the information image 40 in the camera image 50 will be referred to as the contour abcd.

The camera 11 captures an image of the non-rectangular field of view 49, to generate the rectangular camera image 50. As a result, the rectangular information image 40 projected within the field of view 49 of the camera 11 is distorted in the camera image 50, as shown in FIG. 8.

When the camera image 50 is input from the camera 11, the control unit 13 detects the contour abcd of the information image 40 in the camera image 50.

Figure 9:
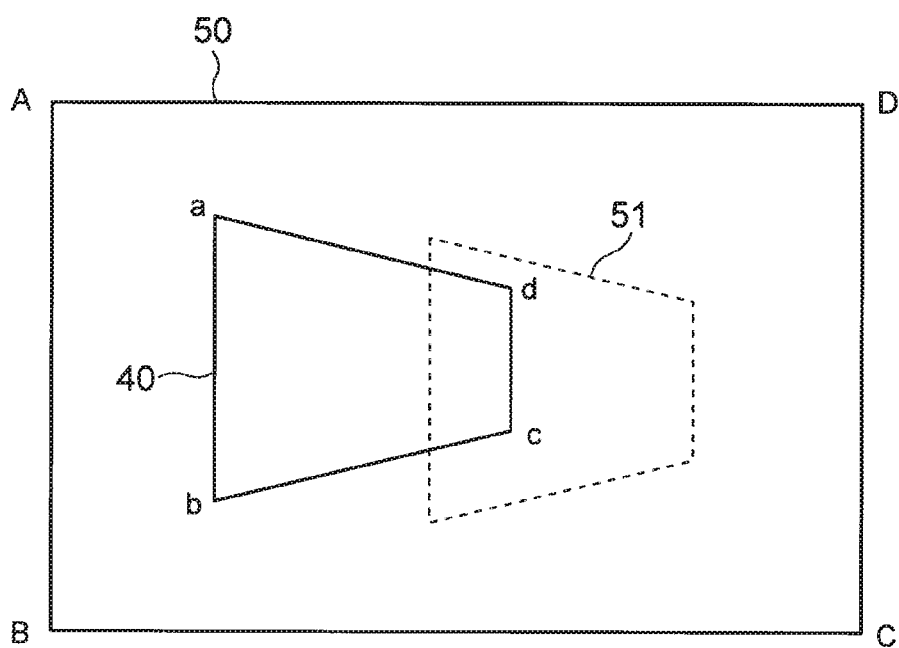
FIG. 9 It depicts a schematic diagram showing an example state in which the contour in the camera image indicated by contour information is superimposed on the camera image shown in FIG. 8.

Contour information is also given to the control unit 13 in advance. As described above, contour information is information indicating the contour of the information image in the camera image in a case where an image of the information image is captured at a certain target position with an attitude and a camera orientation determined in accordance with the target position. FIG. 9 is a schematic diagram showing an example state in which the contour in the camera image indicated by the contour information is superimposed on the camera image shown in FIG. 8. The control unit 13 then calculates the difference M between the current position of the UAV 10 and the target position, in accordance with a contour 51 in the camera image 50 indicated by the contour information and the contour abcd of the information image 40 in the camera image 50. It should be noted that the difference M includes not only the position but also attitude information. Since the same applies to the description below, explanation of attitude information will not be repeated unless otherwise specified.

In a case where the information image is not recognized in the camera image, the control unit 13 moves the UAV 10 by controlling the motors 17a through 17d via the motor driver 16.

In a case where the information image is recognized in the camera image, on the other hand, the control unit 13 calculates the difference M between the current position of the UAV 10 and the target position. The control unit 13 further performs a process of removing the distortion of the information image 40 in the camera image 50 (in other words, a process of turning the information image 40 in the camera image 50 into a rectangular shape). The control unit 13 then recognizes the control contents indicated by the information image 40 after the process, and controls the UAV 10 in accordance with the control contents. For example, the control unit 13 performs imaging for inspecting the state of the surface of the building 30, in accordance with the control contents indicated by the information image 40. The control unit 13 also derives the contents of control for movement from the current position to the next target position, from the calculated difference M (the difference between the current position of the UAV 10 and the target position) and the contents of control for movement to the next target position indicated by the information image 40. In accordance with the control contents, the control unit 13 controls the respective motors 17a through 17d via the motor driver 16, to move the UAV 10. The control unit 13 further controls the attitude of the UAV 10 and controls the orientation of the camera 11 via the camera angle control unit 15, in accordance with the control contents indicated by the information image 40.

The camera angle control unit 15 controls the orientation of the camera 11, under the control of the control unit 13. Specifically, the camera angle control unit 15 controls the elevation angle and the horizontal angle of the camera 11.

The motor driver 16 drives the respective motors 17a through 17d, under the control of the control unit 13. The motor driver 16 is capable of driving the motors 17a through 17d independently of one another. Thus, the control unit 13 can perform control to move the UAV 10 back and forth, control to move the UAV 10 to right and left, control to move the UAV 10 up and down, pitch angle control, roll angle control, and yaw angle control.

The communication unit 18 is a communication interface to be used for communication with the projection station 20.

The control unit 13 and the camera angle control unit 15 may be formed with the CPU of a computer that operates according to a program, for example. In that case, the CPU reads the program, and, according to the program, functions as the control unit 13 and the camera angle control unit 15. Alternatively, the control unit 13 and the camera angle control unit 15 may be formed with different hardware from each other.

Figure 10:
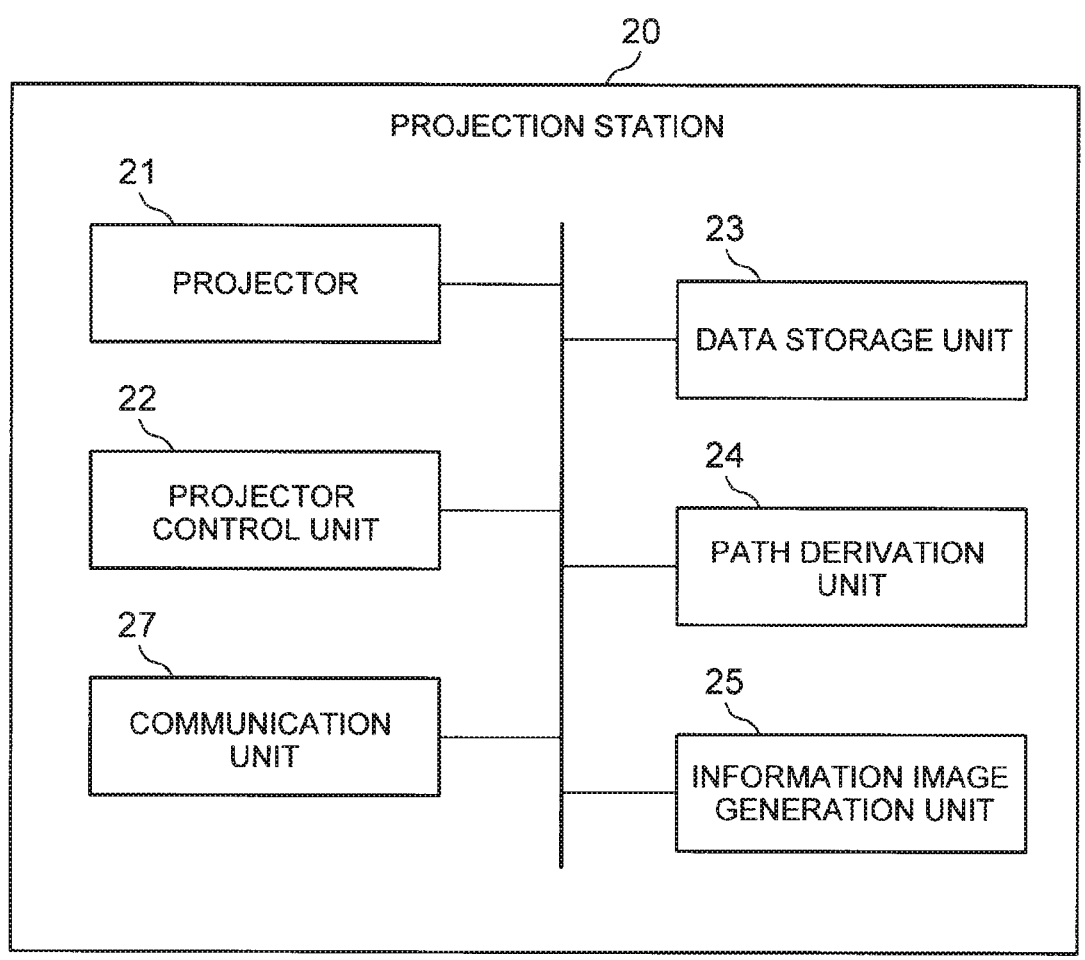
FIG. 10 It depicts a schematic block diagram showing an example configuration of a projection station.

Next, an example configuration of the projection station 20 is described. FIG. 10 is a schematic block diagram showing an example configuration of the projection station 20. The projection station 20 includes a projector 21, a projector control unit 22, a data storage unit 23, a path derivation unit 24, an information image generation unit 25, and a communication unit 27.

The data storage unit 23 is a storage device that stores information about the external appearance of the building and the three-dimensional shape of the building.

The path derivation unit 24 recognizes the positional relationship between the projection station 20 and the building. At this stage, the path derivation unit 24 may be provided with the current position of the projection station 20 from the outside, for example. In accordance with the positional relationship, and the information about the external appearance of the building and the three-dimensional shape of the building, the path derivation unit 24 determines information image projection portions on a surface of the building 30. The path derivation unit 24 further derives a path for the UAV 10.

For example, the path derivation unit 24 divides the surface of the building in a lattice-like fashion, in accordance with the information stored in the data storage unit 23. By doing so, the path derivation unit 24 may set inspection zones, and set a predetermined portion in each inspection zone (the center of the inspection zone, for example) as an information image projection portion. However, the method of determining the information image projection portions is not limited to the above example, and projection portions may be determined by some other method. Further, the path derivation unit 24 sets a path for the UAV 10 so that images of the information images projected onto the respective projection portions can be captured. At this stage, the path derivation unit 24 preferably determines a path with which power consumption by the UAV 10 is minimized. However, the path derivation unit 24 may determine a path in accordance with criteria other than power consumption.

At this stage, the path derivation unit 24 determines the target positions for the UAV 10 to capture the information images projected onto the projected portions, with the target portions corresponding to the projection portions. The path derivation unit 24 further sets the attitude of the UAV 10 and the orientation of the camera at each target position. This attitude and the orientation of the camera are the attitude and the orientation of the camera at the time of capturing the information images. However, due to the influence of wind or the like, it is difficult for the actually moving UAV 10 to capture an information image at a predetermined target position with a predetermined attitude and a predetermined camera orientation. Therefore, the UAV 10 may capture the information image in the vicinity of the target position. Further, the attitude of the UAV 10 and the orientation of the camera at that time may not coincide with the attitude and the camera orientation determined together with the target position.

The information image generation unit 25 generates an information image for each projection portion. The information image generation unit 25 generates an information image to be projected onto a projection portion (denoted by #i), in accordance with the positional relationship between the target position (denoted by #$P_i$) corresponding to the projection portion #i and the target position (denoted by #$P_i$+1) corresponding to the next projection portion (denoted by #i+1). The information image generation unit 25 also generates contour information for each target position.

The projector 21 projects an information image onto a surface of the building. The orientation of the projector 21 is variable.

The projector control unit 22 controls the orientation of the projector 21. As the projector control unit 22 changes the orientation of the projector 21, it is possible to project an information image onto a predetermined projection portion.

When directing the projector 21 toward an information image projection portion, the projector control unit 22 also corrects the information image so that the information image will not be distorted on the surface of the building, in accordance with the orientation of the projector 21, and the information about the external appearance of the building and the three-dimensional shape of the building. In other words, the projector control unit 22 corrects the information image so that a rectangular information image is projected on the surface of the building. The projector 21 projects the information image corrected by the projector control unit 22. Note that, in the description below, explanation of the information image correcting operation by the projector control unit 22 will not be unnecessarily made.

The communication unit 27 is a communication interface to be used for communication with the UAV 10.

The path derivation unit 24, the information image generation unit 25, and the projector control unit 22 may be formed with the CPU of a computer that operates according to a program, for example. In that case, the CPU reads the program, and, according to the program, functions as the path derivation unit 24, the information image generation unit 25, and the projector control unit 22. Alternatively, the path derivation unit 24, the information image generation unit 25, and the projector control unit 22 may be formed with different hardware from each other.

Further, the control unit 13 (see FIG. 6) may be provided in the projection station 20 or another information processing device, instead of the UAV 10. The operation of the control unit 13 is performed by the projection station 20 or the information processing device, and control on the movement and control on the attitude of the UAV 10, control on the orientation of the camera 11, and the like may be performed through communication with the outside (the projection station 20, for example).

Figure 11:
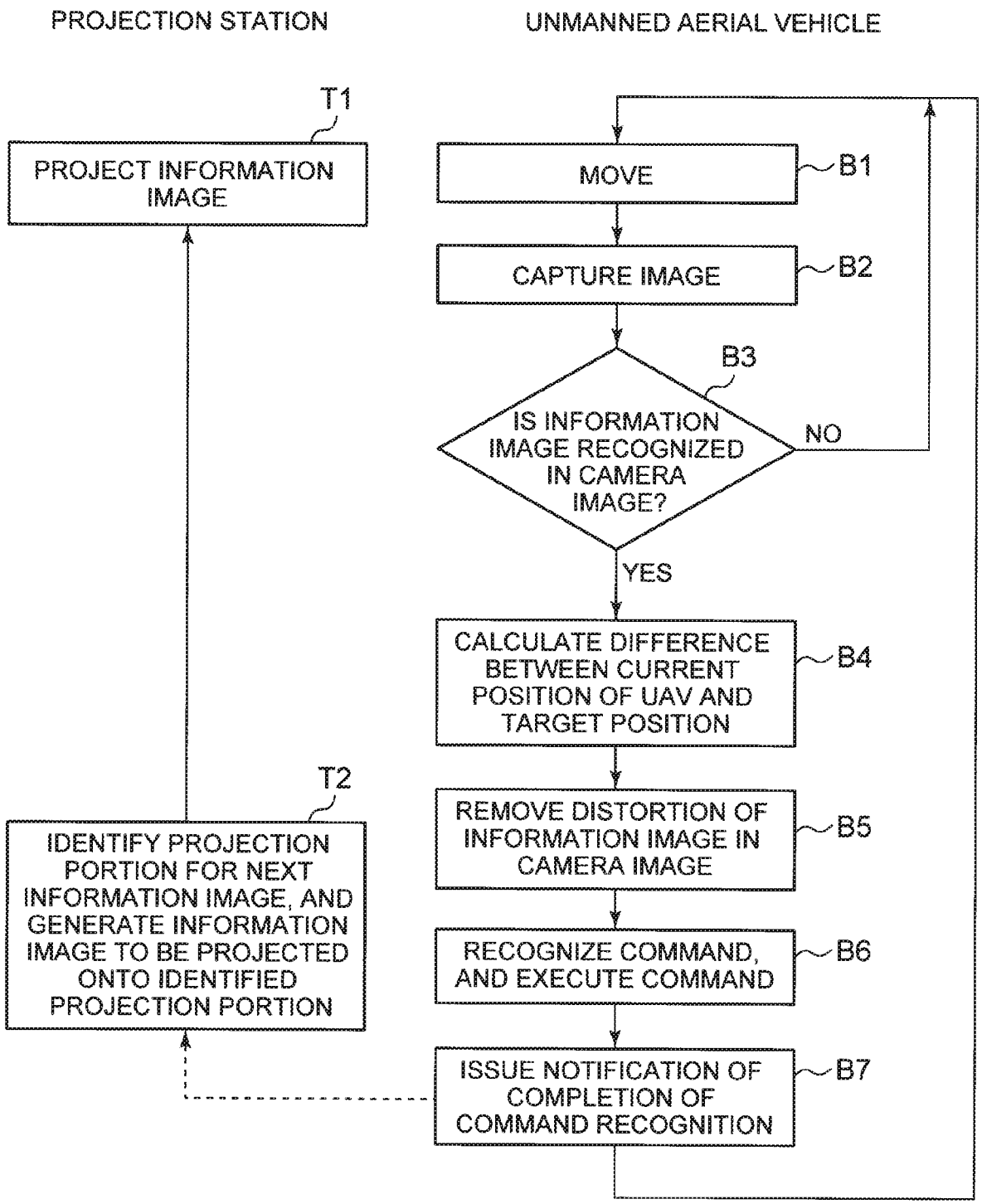
FIG. 11 It depicts a flowchart showing an example of a processing process according to a first exemplary embodiment of the present invention.

Next, a processing process according to the first exemplary embodiment of the present invention is described. FIG. 11 is a flowchart showing an example of a processing process according to the first exemplary embodiment of the present invention. It should be noted that the flowchart shown in FIG. 11 is an example, and the processing process of the present invention is not limited to the flowchart shown in FIG. 11.

Also, the path derivation unit 24 of the projection station 20 sets information image projection portions beforehand on a surface of the building, derives a path for the UAV 10, and sets each target position for the UAV 10 to capture an information image, and the attitude of the UAV 10 and the orientation of the camera at each target position. Further, in the first exemplary embodiment, any change is not to be made to the path during inspection, for ease of explanation. Also, in the example described below, a large external disturbance that is instantaneously caused does not affect the UAV 10 (for example, the UAV 10 is not greatly deviated from the path due to a sudden gust of wind). However, deviation from a target position (see FIG. 2) due to normal wind or the like can occur.

The projection station 20 projects an information image from the projector 21 onto the projection portion for the image on a surface of a building (step T1). In step T1 for the first time, the projection station 20 projects the first information image onto the projection portion for the image.

Meanwhile, the control unit 13 moves the UAV 10 toward the target position for capturing an image of the target image projected in step T1 (step B1). In a case where the first information image is projected, the inspection operator remotely operates the UAV 10. The inspection operator moves the UAV 10 so that the first information image enters the field of view of the camera 11. In accordance with the remote operation by the inspection operator, the control unit 13 moves the UAV 10 so that the information image projected on the surface of the building enters the field of view of the camera 11.

While moving, the UAV 10 captures an image of the surface of the building with the camera 11, to obtain a camera image (step B2). The camera 11 inputs the generated camera image to the control unit 13.

As the camera image is input, the control unit 13 searches for the information image in the camera image (step B3). A successful search means that the information image is recognized in the camera image. On the other hand, a failure in the search means that the information image cannot be recognized in the camera image. If the information image is successfully recognized in the camera image (Yes in step B3), the control unit 13 calculates the difference between the current position of the UAV 10 and the target position (step B4). In a case where the information image cannot be recognized in the camera image in step B3, such as a case where any information image does not exist in the camera image or where the information image is cut off in the middle, the UAV 10 continues to move.

FIG. 12 is a schematic diagram showing examples of camera images in which the information image cannot be recognized.

FIG. 12(a) shows a case where any information image is not shown in the camera image 50. In this case, any information image does not exist in the camera image, and therefore, the control unit 13 cannot recognize the information image in the camera image.

FIG. 12(b) shows a case where only part of the information image 40 is shown in the camera image 50. In this case, the information image 40 is cut off in the middle, and therefore, the control unit 13 cannot recognize the information image in the camera image.

FIG. 12(c) shows a case where the information image 40 is shown in the camera image 50, but the area of the information image 40 in the camera image 50 is extremely small (smaller than a threshold value). In this case, the area of the information image 40 is too small for the control unit 13 to recognize the information image in the camera image.

If the information image cannot be recognized in the camera image (No in step B3), the UAV 10 repeats the operations in and after step B1. In a case where the UAV 10 is moving toward the target position corresponding to the first projection portion, if the control unit 13 cannot determine in which direction to move in accordance with the most recently obtained camera image, the control unit 13 continues to move the UAV 10 in accordance with the remote operation by the inspection operator. For example, in a case where any information image is not shown in the most recently obtained camera image, the control unit 13 continues to move the UAV 10 in accordance with the remote operation by the inspection operator. In a case where the control unit 13 can determine in which direction to move in accordance with the most recently obtained camera image, the control unit 13 starts an autonomous operation, without depending on a remote operation by the inspection operator. For example, as shown in the example in FIG. 12(b), in a case where part of the information image 40 is shown in the most recently obtained camera image 50, the control unit 13 determines in which direction the UAV 10 should be moved so that the entire information image 40 enters the field of view of the camera 11. In this case, the control unit 13 autonomously moves the UAV 10 so that the entire information image 40 enter the field of view of the camera 11.

If the information image cannot be recognized in the camera image (No in step B3), steps B1 through B3 are repeated until the information image is recognized in the camera image.

In a case where the information image can be recognized in the camera image, the information image 40 with an appropriate size (in other words, with an area equal to or larger than the threshold value) is shown in the camera image 50, and the contour abcd of the information image 40 can be detected, as shown in FIG. 9 In this case, the control unit 13 calculates the difference between the current position of the UAV 10 and the target position, in accordance with the contour 51 (see FIG. 9) in the camera image 50 indicated by the contour information and the contour abcd (see FIG. 9) of the information image 40 in the camera image 50 (step B4).

Where the information image can be recognized in the camera image, it is safe to say that the UAV 10 exists near the target position. In practice, the UAV 10 repeats the processing in steps B1 through B3 while moving. Therefore, as soon as the entire information images enters the camera image, the UAV 10 determines that the information image is completely recognized in step B3, and therefore, moves on to step B4. In other words, even of the UAV 10 is located relatively far from the target position, the control unit 13 carries out step B4 as soon as the information image enters an edge of the camera image. To prevent this, one of the following measures may be taken, though not shown in FIG. 11: "stop the proceeding to step B4 until the information image enters a certain range in the camera image", "determine the moving direction in which the information image is to be inserted in a certain range in the camera image, and repeats the processing in and after step B1", or "stop the proceeding to step B4 until the information image is recognized in the camera image for a certain time (or by a fixed number of frames)". Alternatively, as the difference M can be calculated in step B4, it is more preferable to calculate the movement amount corresponding to the difference M, and repeat the processing in and after step B1. In addition to this, it is even more preferable to repeat step B1 while controlling the orientation of the camera so that the difference M has a prescribed shape. This is because the UAV 10 can be moved to a more accurate position, or the UAV 10 can be made to have a more accurate attitude, by virtue of the movement of the UAV 10 and the control on the camera 11 based on the difference M.

After calculating the difference between the current position of the UAV 10 and the target position, the control unit 13 removes the distortion of the information image 40 in the camera image 50 (step B5). As already explained, the information image 40 projected on the surface of the building has a rectangular shape, and the field of view 49 of the camera does not have a rectangular shape (see FIG. 7(b)). On the other hand, the camera image 50 obtained by capturing an image of the field of view 49 has a rectangular shape. Therefore, the information image 40 shown in the camera image 50 is not rectangular but is distorted (see FIG. 8). In step B5, the control unit 13 removes this distortion.

The control unit 13 then recognizes the command (control contents) indicated by the information image 40 after the distortion removal, and executes the command (step B6).

In this example case, the control unit 13 recognizes the command (control contents) indicated by the information image 40 shown as an example in FIG. 3, and then executes the command.

Specifically, the control unit 13 recognizes a command for staying in the air without moving for a predetermined period of time, and performing imaging for inspecting the state of a surface of the building during the stay. In accordance with the command, the control unit 13 stays in the air without moving for a predetermined period of time, and, during the stay, captures an image of the surface of the building with the camera 11. At this stage, the information image 40 may remain projected in the field of view of the camera 11.

The control unit 13 also recognizes the command for descending after the stay for the predetermined period of time, making the camera 11 face upward while fixing the horizontal angle of the camera 11 when descending, and controlling the attitude of the UAV 10 to be horizontal. At this stage, the control unit 13 derives the contents of control for movement to the next target position, in accordance with the difference between the current position of the UAV 10 and the target position as calculated in step B4, and the contents of control for descending. In accordance with the control contents, the control unit 13 controls the respective motors 17a through 17d via the motor driver 16, to move the UAV 10. That is, the control unit 13 corrects the control contents relating to the movement indicated by the information image 40, in accordance with the difference calculated in step B4. In accordance with the corrected control contents, the control unit 13 moves the UAV 10.

After recognizing the command indicated by the information image 40, the control unit 13 also notifies the projection station 20 that the command recognition is completed (step B7).

After starting moving the UAV 10 in accordance with the above corrected control contents, the control unit 13 repeats the operations in and after step B1. In step B1 this time, the control unit 13 autonomously moves the UAV 10, without depending on a remote operation by the inspection operator, which differs from the case where the UAV 10 moves toward the target position corresponding to the first projection portion.

Upon receipt of the notification of the completion of command recognition from the UAV 10, the projector control unit 22 causes the projector 21 to stop the projection of the information image that has been projected so far. Further, upon receipt of the notification of the completion of command recognition from the UAV 10, the information image generation unit 25 identifies the next information image projection portion (the projection portion for the second information image in this case), and generates the second information image to be projected onto the projection portion (step T2). In this example, the information image generation unit 25 generates an information image that contains a command for performing imaging for state inspection in the vicinity of the second target position, a command for moving the UAV 10 from the second target position to the third target position, and the like.

The UAV 10 captures an image of the surface of the building with the camera 11 while moving (step B2), and the control unit 13 carries out step B3. Until the second information image is projected, the second information image does not appear in the camera image, and therefore, the UAV 10 repeats steps B1 through B3.

After the information image generation unit 25 generates, in step T2, the information image (the second information image in this case) to be projected onto the next projection portion, the projector control unit 22 controls the projector 21 to project the information image onto the projection portion. As a result, the projector 21 projects the second information image onto the projection portion for the second information image (step T1).

In a case where the UAV 10 has moved to such a position that the newly projected information image enters the field of view of the camera 11, and the information image is recognized in the camera image (Yes in step B3), the UAV 10 repeats the processing in and after step B4. Further, in a case where the projection station 20 receives the notification in step B7, the projection station 20 stops the projection of the information image that has been projected so far, and carries out steps T2 and T1.

By repeating the above processing, the UAV 10 can capture images of the surface of the building for state inspection, while moving in the vicinity of a predetermined path.

In a case where the projection station 20 projects the last information image, and the control unit 13 executes the command indicated by the last information image, the unmanned flying device control system may end the processing, without issuing the notification in step B7. In this case, the projection station 20 may incorporate a predetermined symbol indicating that it is the last information image into the last information image, so that the control unit 13 can recognize that it is the last information image.

According to this exemplary embodiment, the control unit 13 repeats the steps B1 through B3 until the information image is recognized in the camera image. In a case where the information image is recognized in the camera image, the control unit 13 calculates the difference M, removes the distortion of the information image in the camera image, recognizes the command indicated by the information image, and then operates in accordance with the command. As the control unit 13 repeats this operation, it is possible to capture images of the surface of the building for state inspection while moving in the vicinity of a predetermined path. Thus, with a simple structure, the UAV 10 can be guided to a position near the target position in the vicinity of the building.

Further, as the UAV 10 is guided by information images in the present invention, the UAV 10 does not need to receive any GPS signal. Accordingly, in the present invention, there is no need to provide a large number of facilities substituting for GPS satellites to obtain position information with GPS signals at any place. In this aspect, the system configuration can also be simplified in the present invention.

Further, in the present invention, the UAV 10 is guided by information images. As the UAV 10 approaches an information image and then obtains the difference, it is possible to accurately obtain the information image, and the position and the attitude of the UAV 10. That is, as the UAV 10 that functions as a measuring device approaches an information image serving as the measurement target, error factors become fewer. As a result, it becomes possible to conduct more accurate position measurement than GPS and other methods, and perform guidance based on the results of the measurement.

The UAV 10 also derives the difference between the current position of the UAV 10 and the target position, in accordance with an information image. By using this difference, the UAV 10 can accurately move to the target position.

The UAV 10 also derives the contents of control for movement to the next target position, in accordance with the difference between the current position of the UAV 10 and the target position, and the movement control contents indicated by an information image. As a result, the UAV 10 can move to the vicinity of the next target position. That is, it is possible to control the movement of the UAV 10 with high precision. Further, as described above, the UAV 10 does not need to receive GPS signals in the present invention. Thus, even at places where it is difficult to receive GPS signals, the UAV 10 can be accurately controlled.

Meanwhile, the projection station 20 projects an information image in a certain size onto a building, and the UAV 10 monitors this information image. Further, the positional relationship between this information image and the UAV 10 can be calculated in the UAV 10, and thus, the UAV 10 can continuously acquire the positional relationship substantially in real time. Because of this, even if the position of the UAV 10 changes greatly or the attitude of the UAV 10 loses balance due to external disturbance such as a sudden gust of wind, the UAV 10 can correct its position and attitude before coming into contact with the building.

Next, modifications of the first exemplary embodiment are described.

In the case described in the above exemplary embodiment, the control unit 13 removes the distortion of the information image 40 in the camera image 50 in step B5. If the control unit 13 can recognize the command indicated by the information image 40 without any distortion removal from the information image 40, step B5 may be skipped.

Also, in the case described in the above exemplary embodiment, when an image of the surface of the building for inspecting the state of the building is captured in step B6, an image of the surface of the building is captured while the information image 40 remains projected in the field of view of the camera 11. When an image of the surface of the building is captured for inspecting the state of the building, the control unit 13 may instruct the projection station 20 to stop the projection of the information image. In this case, the information image generation unit 25 of the projection station 20 generates an information image that instructs to capture an image for state inspection and an information image that instructs to move to the next target position, with respect to one projection portion. The information image generation unit 25 incorporates, into an information image that instructs to capture an image for state inspection, a command for notifying the projection station 20 of a stop of the projection of the information image, a command for capturing an image of the building for state inspection after the notification (in other words, after the projection station 20 stops the projection in accordance with the notification), and a command for notifying the projection station 20 of completion of the imaging after the imaging is completed. The projection station 20 first projects the information image onto the projection portion. In a case where the control unit 13 recognizes those commands, and notifies the projection station 20 of a stop of the projection, the projection station 20 stops the projection of the information image. In that situation, the UAV 10 captures an image the surface of the building. Further, in a case where the UAV 10 notifies the projection station 20 of completion of the imaging, an information image that instructs to move to the next target position is projected onto the same projection portion. At this stage, the UAV 10 might move slightly due to the influence of wind or the like, while capturing an image for state inspection. Therefore, even after the information image that instructs to move to the next target position is projected, the UAV 10 preferably again performs the operations in and after step B2. This is to recalculate the difference between the current position of the UAV 10 and the target position.

In step B6, in accordance with the difference, the control unit 13 corrects the movement control contents indicated by the information image.

When an image of the surface of the building is captured while the information image remains projected, the portions other than the information image might become relatively dark in the camera image. As described above, in a case where the UAV 10 captures an image for state inspection, the projection station 20 stops the projection of the information image. Thus, such a problem can be prevented.

Further, in a case where the projection station 20 stops projection of an information image when the UAV 10 captures an image for state inspection, the projector control unit 22 may cause the projector 21 to emit white light or light of an appropriate color, after causing the projector 21 to stop the projection of the information image. In this case, under the control of the projector control unit 22, the projector 21 emits light onto the surface of the building to be subjected to the state inspection. As a result, the UAV 10 captures an image of the surface of the building to inspect the state of the building, with the light being emitted onto the surface of the building.

As the projector 21 emits light onto the surface of the building, it is possible to compensate for light deficiency when the camera 11 of the UAV 10 captures an image of the surface of the building. For example, in a case where the camera 11 captures an image of a portion deep inside the building or where the unmanned flying device control system is operated at night, there is a deficiency of light, and therefore, a camera image that clearly shows the surface of the building cannot be obtained. When the camera 11 of the UAV 10 captures an image of the surface of the building to inspect the state of the building, the projector 21 emits light onto the surface of the building, so that the deficiency of light can be compensated for as described above, and the camera 11 can generate a camera image that clearly shows the surface of the building.

Note that the projection station 20 may include a projector for emitting light, as well as the projector 21.

Further, the shape of the contour of the information image to be projected from the projection station 20 may not always be the same. The contour information needs to be known before step B3, in which the information image is recognized. Therefore, the contour information may be included in the previous information image, the projection station 20 may send the contour information to the UAV 10 through communication, or the contour information about each information image may be stored beforehand into the UAV 10. Every time calculating a difference M, the control unit 13 should use the contour information corresponding to the information image. Further, the contour of an information image may be deformed so that the information image does not become obstacle at the time of inspection of the state of the building.

In each of the exemplary embodiments described below, explanation of the same aspects as those already described will not be repeated.

Second Exemplary Embodiment

A second exemplary embodiment of the present invention concerns an operation to be performed in a case where the attitude and the position of the UAV 10 change due to a large external disturbance affecting the UAV 10, and the control unit 13 loses sight of the information image shown in the camera image. Even if an information image is shown in the camera image before the UAV 10 is subjected to an external disturbance, and the control unit 13 recognizes the information image, the information image projected onto the building might move out of the field of view of the camera 11 when the attitude and the position of the UAV 10 change due to the external disturbance. As a result, the information image disappears from the camera image. That is, the control unit 13 loses sight of the information image in the camera image.

In that case, the control unit 13 changes the attitude of the UAV 10 in each direction, and performs imaging with the camera 11. Alternatively, the control unit 13 changes the orientation of the camera 11 via the camera angle control unit 15, and performs imaging with the camera 11. At this stage, the control unit 13 may change the attitude of the UAV 10, and also change the orientation of the camera 11. As a result, the control unit 13 acquires a camera image showing the information image, and then performs the operations in and after step B4 (see FIG. 11).

At this stage, in accordance with camera images of the most recent frames, the control unit 13 may also determine how much the position and the attitude of the UAV 10 have changed from the position and the attitude observed when the control unit 13 recognized an information image in a camera image.

Alternatively, the UAV 10 may include an inertial navigation device. The inertial navigation device may detect how much the position and the attitude of the UAV 10 have changed from the position and the attitude observed when the control unit 13 recognized an information image in a camera image.

In accordance with the respective amounts of changes in the position and the attitude of the UAV 10, the control unit 13 determines in which direction the attitude of the UAV 10 and the orientation of the camera 11 should be directed so as to direct the field of view of the camera 11 toward the information image. The control unit 13 then changes the attitude of the UAV 10 and the orientation of the camera 11, in accordance with the determination results. In this case, the control unit 13 can promptly direct the field of view of the camera 11 toward the information image, and quickly capture an image of the information image being projected.

The control unit 13 may also notify the projection station 20 of the amounts of changes in the position and the attitude of the UAV 10 since the time when the control unit 13 recognized an information image in a camera image. The control unit 13 may detect the amounts of changes in accordance with camera images of the most recent frames, as in the above described example. Alternatively, the UAV 10 may include an inertial navigation device, and the inertial navigation device may detect the amounts of changes in the position and the attitude of the UAV 10 since the time when the control unit 13 recognized an information image in a camera image.

After being notified of the amounts of changes in the position and the attitude of the UAV 10, the information image generation unit 25 (see FIG. 10) of the projection station 20 calculates the field of view of the camera 11 from the amounts of changes, and generates the information image to be projected onto the field of view. This information image is an information image for guiding the UAV 10 to the position where the control unit 13 recognized an information image in a camera image. The projector control unit 22 directs the projector 21 toward the calculated field of view of the camera, and causes the projector 21 to project the information image. The camera 11 then performs imaging (step B2), and after that, the UAV 10 performs the operations in and after step B3. As a result, in accordance with the information image, the UAV 10 can return to the position where the control unit 13 recognized an information image in a camera image. After receiving the notification in step 7, the projector control unit 22 may also cause the projector to project the original information image again onto the original projection portion. In this case, the camera 11 also performs imaging (step B2), and after that, the UAV 10 performs the operations in and after step B3.

Further, the projection station 20 may have a structure that includes a tracking camera (not shown) that captures an image of the UAV 10 while following the UAV 10, and a state change detection unit (not shown) that detects the amounts of changes in the position and the attitude of the UAV 10, in accordance with the image of the UAV 10 obtained by the tracking camera. In a case where the state change detection unit detects rapid movement of the UAV 10 caused by an external disturbance in accordance with the image obtained by the tracking camera in this case, the state change detection unit detects the amounts of changes in the position and the attitude of the UAV 10 since the time immediately before the movement. The information image generation unit 25 (see FIG. 10) then calculates the field of view of the camera from the amounts of changes, and generates the information image to be projected onto the field of view, as in the above described case. This information image is an information image for guiding the UAV 10 to the position where the control unit 13 recognized an information image in a camera image. The projector control unit 22 directs the projector 21 toward the calculated field of view of the camera, and causes the projector 21 to project the information image. The operations thereafter are the same as above, and therefore, explanation of them is not made herein.

According to the second exemplary embodiment, even if the field of view of the camera 11 is directed in a different direction from the direction toward the information image due to an external disturbance, the UAV 10 again captures an image of the information image, and can return to the normal control.

Third Exemplary Embodiment

In a third exemplary embodiment of the present invention, an unmanned flying device control system avoids a situation where an information image overlaps the shadow of the UAV 10 in a camera image.

The path derivation unit 24 of the projection station 20 sets information image projection portions that are projection portions not to overlap the shadow of the UAV 10.

For example, the path derivation unit 24 divides a surface of a building in a lattice-like fashion, in accordance with the information stored in the data storage unit 23. By doing so, the path derivation unit 24 sets inspection zones, and sets a predetermined portion in each inspection zone (the center of the inspection zone, for example) as an information image projection portion. The path derivation unit 24 also determines the target position of the UAV 10, and the attitude of the UAV 10 and the orientation of the camera at the target position, for each projection portion. The path derivation unit 24 then determines whether the projection portion overlaps the shadow of the UAV 10, for each projection portion. This determination can be performed in accordance with the positional relationship among the projection station 20, the target position, and the projection portion. As for a projection portion that overlaps the shadow of the UAV 10, the path derivation unit 24 changes the projection portion to a position that does not overlap the shadow of the UAV 10 within the inspection zone, and, in accordance with the change, also changes the attitude of the UAV 10 and the orientation of the camera corresponding to the projection portion. At this point of time, the path derivation unit 24 may also change the target position of the UAV 10. In a case where a projection portion overlaps the shadow of the UAV 10 in an inspection zone even after the position of the projection portion is changed, it is determined that any projection portion is not to be set for the inspection zone. The path derivation unit 24 then determines a path for capturing an image of the information image projected onto each of the projection portions that do not overlap the shadow of the UAV 10.

As the information image projection portions are set in this manner, it becomes easy to prevent an information image projected onto a projected portion from overlapping the shadow of the UAV 10 in a camera image.

Even in a case where the path derivation unit 24 sets projection portions that do not overlap the shadow of the UAV 10 as described above, the UAV 10 is affected by wind or the like, and therefore, it is normally rare that an image of an information image is captured at the target position corresponding to a projection portion. As a result, even in a case where projection portions are set as described above, an information image projected onto a projection portion might overlap the shadow of the UAV 10.

Figure 13:
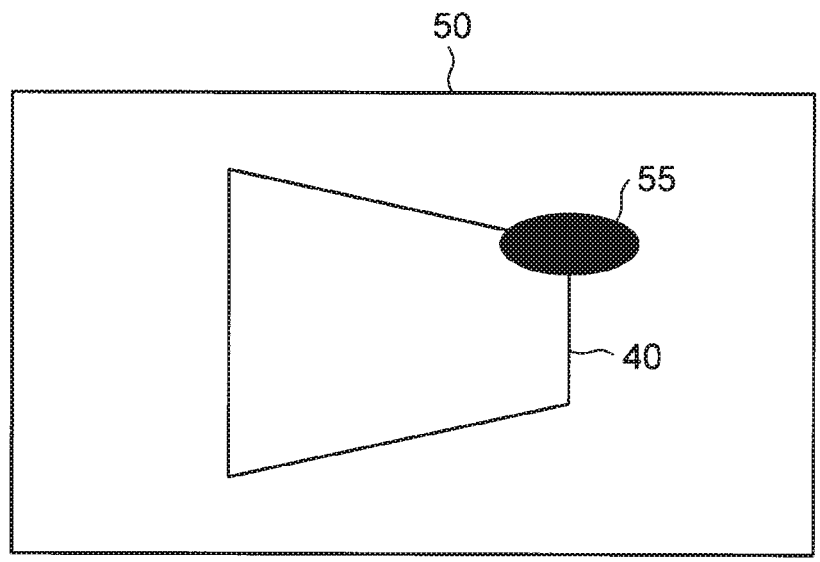
FIG. 13 It depicts a schematic diagram showing an example of a camera image in which an information image and the shadow of the UAV overlap each other.
Figure 14:
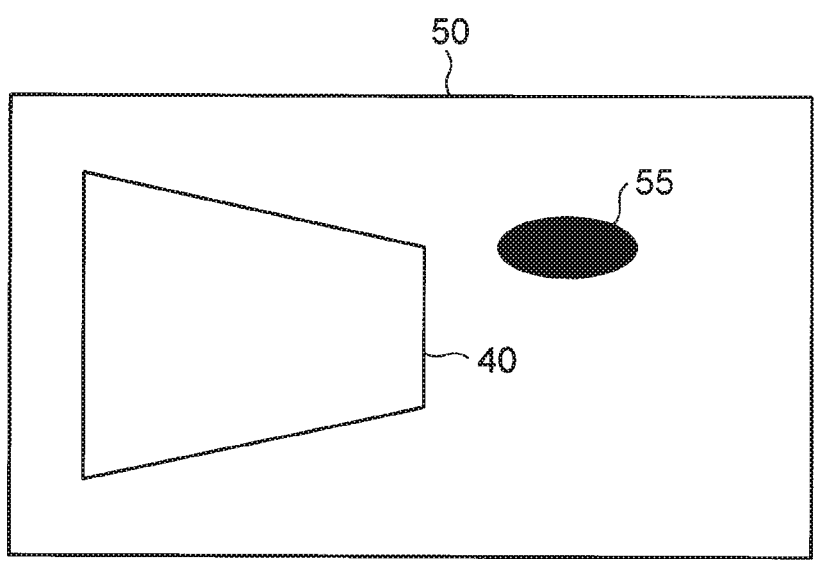
FIG. 14 It depicts a schematic diagram showing an example of a camera image in which an information image and the shadow of the UAV no longer overlap each other, because the UAV has moved.

In such a case, the control unit 13 should move the UAV 10. FIG. 13 is a schematic diagram showing an example of a camera image in which an information image and the shadow of the UAV 10 overlap each other. In a case where the control unit 13 determines that part of the contour of the information image 40 is cut off by the existence of a black pixel group, the control unit 13 determines that part of the outer peripheral portion of the information image 40 and a shadow 55 overlap each other, as shown in the example in FIG. 13. In a case where the control unit 13 has made such a determination, the control unit 13 moves in any appropriate direction, and performs the operations in and after step B1 (see FIG. 11), for example. At this point of time, in accordance with the portion of the contour of the information image 40 that is cut off by the shadow 55, the control unit 13 may also determine the direction in which the UAV 10 is to be moved, and then move the UAV 10 in the direction. FIG. 14 is a schematic diagram showing an example of a camera image in which the information image 40 and the shadow 55 of the UAV 10 no longer overlap each other, because the UAV 10 has moved. From the example camera image shown in FIG. 14, it is possible to detect the position of the entire contour of the information image 40. After moving the UAV 10, the control unit 13 can calculate the difference between the current position and the target position, using the example camera image shown in FIG. 14. After that, the control unit 13 performs the operations in and after step B5 (see FIG. 11).

In this manner, in a case where an overlap between the information image 40 and the shadow of the UAV 10 is detected, the control unit 13 can eliminate the overlap between the information image 40 and the shadow of the UAV 10 by moving the UAV 10. This operation can be applied even in a case where the path derivation unit 24 has not determined statistics portions so that the shadow of the UAV 10 and any of the projection portions do not overlap with each other.

In the operation described above, the UAV 10 moves, to avoid any overlap between the information image 40 and the shadow of the UAV 10. The control unit 13 may avoid an overlap between the information image 40 and the shadow of the UAV 10 by causing the projection station 20 to change the information image projection portion. For example, the control unit 13 determines that part of the outer peripheral portion of the information image 40 and the shadow 55 overlap each other, as in the case described above. In this case, in accordance with the portion cut off from the contour of the information image 40 by the shadow 55, the control unit 13 determines in which direction and how much the projection station 20 should move the information image projection portion so as to avoid any overlap between the information image 40 and the shadow 55, and then notifies the projection station 20 of the moving direction and the amount of movement of the projection portion. This notification can be regarded as an instruction to change the projection portion. Upon receipt of this notification, the information image generation unit 25 of the projection station 20 changes the contents of the information image 40, in accordance with the moving direction and the amount movement indicated in the notification. This is because the contents of control for movement to the next projection portion changes with the information image projection portion. The path derivation unit 24 also sets the target position to be used in a case where the projection portion is moved in accordance with the moving direction and the amount of movement indicated in the notification, and sets the attitude and the camera orientation at the target position. The projector control unit 22 directs the projector 21 toward the projection portion in accordance with the moving direction and the amount of movement indicated in the notification, and then causes the projector 21 to project the information image 40. As a result, the UAV 10 obtains the example camera image shown in FIG. 14, for example. After that, the control unit 13 performs the operations in and after step B4 (see FIG. 11).

As the UAV 10 causes the projection station 20 to change the projection portion for the information image 40 as described above, any overlap between the information image 40 and the shadow of the UAV 10 can also be avoided. This operation can be applied even in a case where the path derivation unit 24 has not determined statistics portions so that the shadow of the UAV 10 and any of the projection portions do not overlap with each other.

Fourth Exemplary Embodiment

In a fourth exemplary embodiment of the present invention, in a case where power consumption is large due to the weather or the like, and imaging for state inspection cannot be performed in all the inspection zones, the UAV 10 changes the path in the middle.

As described above in the first exemplary embodiment, the path derivation unit 24 sets the path of the UAV 10 so that images of the information images projected onto the respective projection portions can be captured, for example. That is, the path of the UAV 10 is determined so as to pass near the respective projection portions.

At this stage, the path derivation unit 24 preferably determines a path with which power consumption by the UAV 10 is minimized. The UAV 10 consumes a large amount of electric power in a case where the flight velocity vector changes. Therefore, the path derivation unit 24 should determine a path that minimizes the change in the velocity vector of the UAV 10, for example.

Figure 15:
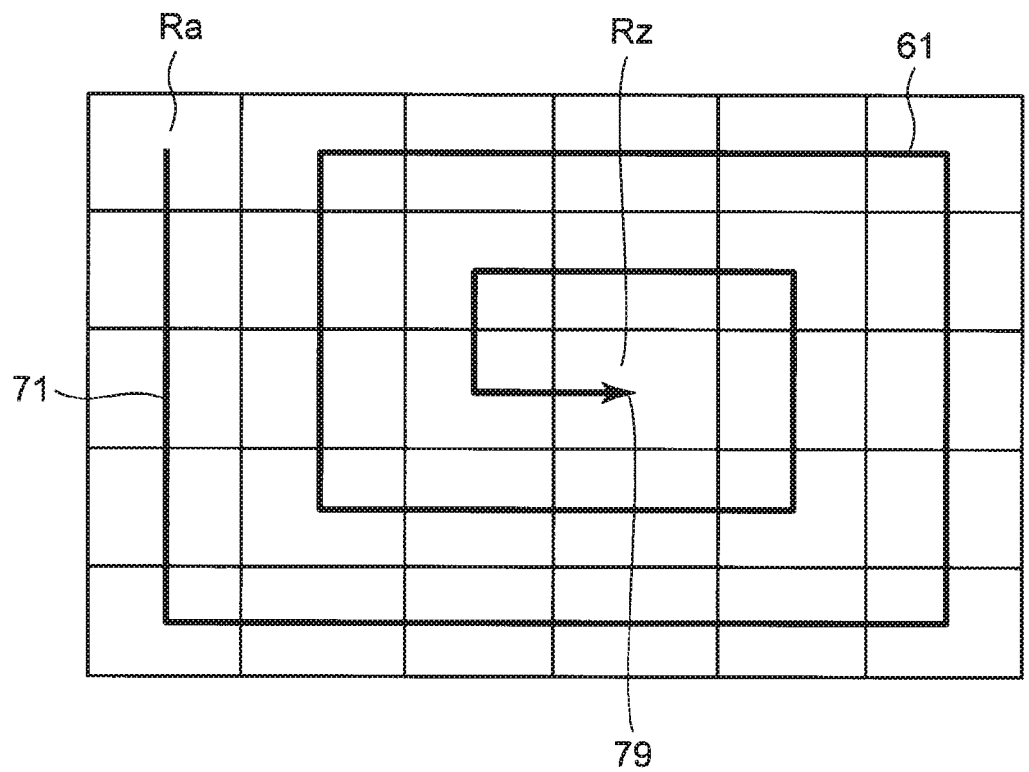
FIG. 15 It depicts a schematic diagram showing an example path of the UAV.

The path derivation unit 24 may set an example path shown in FIG. 15. FIG. 15 shows each inspection zone on a surface of a building and a path 61 of the UAV 10. In FIG. 15, an inspection zone Ra is the first inspection zone, and an inspection zone Rz is the last inspection zone.

The path derivation unit 24 sets a position at which the UAV 10 can switch to a shortcut on the path 61 (this position will be hereinafter referred to as a switchable position). There may be one or more switchable positions. A switchable position 71 shown in FIG. 15 is now described an example.

After setting the path 61, the path derivation unit 24 sets candidates for the shortcut from the switchable position 71 to an end point 79. The path derivation unit 24 sets the candidates for the path so as not to pass through the already-passed inspection zones. Since the candidates for the path are shortcuts from the switchable position 71 to the end point 79, the candidates do not need to pass through all the inspection zones yet to be passed through. Further, the number of the inspection zones through which the candidate paths that are set with respect to the switchable position 71 pass may differ from one candidate path to another. In other words, the candidate path length from the switchable position 71 to the end point 79 may differ from one candidate path to another. Note that, for ease of explanation, in each candidate path, the movement path in one zone from the switchable position 71 to the next inspection zone is the same as a predetermined path in this example.

As for the switchable positions other than the switchable position 71, the path derivation unit 24 also sets candidates for the shortcut to the end point 79 for each switchable position.

Hereinafter, for ease of explanation, the target position of the UAV 10 corresponding to an inspection zone is set as a switchable position.

When notifying the projection station 20 of completion of command recognition (step B7), the control unit 13 of the UAV 10 measures the consumption energy after the start of flight, the remaining battery level at the time, and the weather (the wind velocity of crosswind is taken as an example), and also notifies the projection station 20 of these measured values. Note that sensors for measuring these values are mounted on the UAV 10. However, in a case where a condition for maintaining a sufficient flyable distance (such as a condition that the remaining battery level is equal to or higher than a threshold, for example) is satisfied, the control unit 13 does not need to notify the projection station 20 of the energy consumption, the battery remaining battery level, and the weather (the wind velocity of crosswind).

Further, the path derivation unit 24 holds a prediction expression of a flyable distance beforehand, with the consumption energy, the remaining battery level, and the weather (the wind velocity of crosswind) being explanatory variables, the flyable distance of the UAV 10 being an explained variable. This prediction expression is set in advance by machine learning such as regression analysis, for example. Having been notified of the energy consumption, the remaining battery level, and the weather from the UAV 10, the path derivation unit 24 calculates the flyable distance of the UAV 10 by substituting these values into the explanatory variables of the prediction expression.

Further, the path derivation unit 24 subtracts the flyable distance calculated according to the prediction expression, from the length of each of the path candidates set for the switchable position where the UAV 10 exists. The path derivation unit 24 determines that the path candidate having the smallest subtraction result is the optimum shortcut, and thereafter, uses the path candidate as the path of the UAV 10.

The power consumption by the UAV 10 is affected by weather such as wind. For example, in a case where a strong wind is blowing, thrust against the strong wind is necessary, and therefore, the power consumption becomes larger than that in a case where there is no wind. As a result, in a case where the UAV 10 tries to continue moving along the path 61 that is initially determined, the remaining battery level might become 0 in the course of the path. According to this exemplary embodiment, it is possible to switch to a shortcut to the end point 79 at a switchable position. Thus, the number of the inspection zones to be passed is reduced, but the flight of the UAV 10 to the end point 79 can be maintained.

In the example described above, the consumption energy, the remaining battery level, and the weather are the explanatory variables that are used in the prediction expression of the flyable distance. However, other explanatory variables may be used.

Fifth Exemplary Embodiment

In a fifth exemplary embodiment of the present invention, in a case where the position of the UAV 10 changes due to a large external disturbance that affects the UAV 10, the projection station 20 again derives the path from the position of the change to the end point of the path.

In a case where the UAV 10 has moved due to an external disturbance, and the control unit 13 of the UAV 10 has lost sight of the information image in a camera image, the control unit 13 notifies the projection station 20 of changes in the position and the attitude of the UAV 10 since the time when the control unit 13 recognized the information image in the camera image, as in the example case described in the second exemplary embodiment.

Upon receipt of this notification, the path derivation unit 24 of the projection station 20 calculates the current position of the UAV 10 from this notification. The path derivation unit 24 then derives again a path from that position. However, the path derivation unit 24 derives the new path so as not to pass through the inspection zones already passed by the UAV 10. Here, the new path does not need to pass through all the inspection zones that have not been passed. At this point of time, the path derivation unit 24 preferably selects the path that minimizes the power consumption, for example. For example, as described above, the path derivation unit 24 may set the path having the minimum change in the velocity vector of the UAV 10.

According to this exemplary embodiment, even if the UAV 10 has moved due to an external disturbance such as a sudden gust of wind, the path derivation unit 24 again sets a path from that position. Thus, an increase in power consumption by the UAV 10 can be prevented, and the operation efficiency of the UAV 10 can be increased.

Sixth Exemplary Embodiment

In a sixth exemplary embodiment of the present invention, the projector control unit 22 not only corrects a generated information image so as not to be distorted at the time of projection, but also corrects the color and the brightness of the information image.

In the sixth exemplary embodiment, the projector 21 also projects a predetermined reference image (a white frame-like image in this exemplary embodiment) on a surface of a building. The projector control unit 22 corrects the color of the information image, in accordance with the color of the frame-like portion shown in the camera image. Note that the projector 21 may constantly project a white frame-like image. Alternatively, when an information image projection portion has changed, the projector 21 may project a white frame-like image first, and then project the information image corrected in accordance with the color of the frame-like portion shown in the camera image.

This aspect is described below in greater detail. In a case where the camera 11 of the UAV 10 has captured an image of the surface of the building onto which a white frame-like image is projected, and generated a camera image, the control unit 13 recognizes the color of the frame-like portion in the camera image (or determines in which color the white frame-like image is seen in the camera). The control unit 13 then notifies the projection station 20 of information about the color of the frame-like portion in the camera image.

Upon receipt of the information about the color of the frame-like portion in the camera image, the projector control unit 22 of the projection station 20 corrects the color of the information image generated by the information image generation unit 25, in accordance with the color information.

The fact that the frame-like image projected with white light has some color in the camera image means that the surface of the building reflects only that color. For example, the surface of the building is green, and reflects only the wavelengths within the range of 550 nm±30 nm. In this case, the color of the frame-like portion in the camera image is a color having a wavelength within the range of 550 nm±30 nm. Upon receipt of this information from the UAV 10, the projector control unit 22 corrects the color of the information image so that the wavelength of the color of the information image falls within the range of 530 nm to 570 nm, for example, in accordance with the wavelength in the information.

As a result, the camera 11 can capture an image of the information image projected onto the surface of the building. In the above example, even if an information image in a color having a smaller wavelength than 520 nm or a color having a greater wavelength than 580 nm is projected onto the reflecting surface, the light is not reflected, and the information image is not shown in the camera image. In this exemplary embodiment, the projector control unit 22 corrects the color of an information image, in accordance with the color of the shape image projected with white light in the camera image. Thus, even in a case where the surface of the building reflects only a specific wavelength, the camera 11 can generate a camera image that shows the information image.

The projector control unit 22 may also correct the brightness of an information image, as well as the color. In this case, the control unit 13 recognizes the brightness of the surface of the building onto which the information image is projected, in accordance with the image of the frame-like portion in the camera image. The control unit 13 notifies the projection station 20 of the brightness.

After being notified of the brightness of the information image projected onto the surface of the building, the projector control unit 22 of the projection station 20 corrects the brightness of the information image, in accordance with the brightness. For example, in a case where the surface of the building appears to be dark, the projector control unit 22 perform correction to increase the brightness of the information image.

As the brightness is corrected in this manner, the information image projected onto the surface of the building can be prevented from being buried in ambient light.

The control unit 13 may recognize the color of the frame-like portion in the camera image and the brightness of the surface of the building, and the projector control unit 22 may correct both the color and the brightness of the information image.

In the example described above, the camera 11 of the UAV 10 captures an image of the frame-like image projected onto the surface of the building, and the control unit 13 of the UAV 10 recognizes the color of the frame-like portion in the camera image, and the brightness of the surface of the building. The projection station 20 may also be equipped with a camera, and the camera may capture an image of the frame-like image projected onto the surface of the building. The projection station 20 may also include an image recognition unit (not shown) that recognizes the color of the frame-like portion in the camera image, and the brightness of the surface of the building. That is, the color of the frame-like portion in the camera image, and the brightness of the surface of the building may be recognized on the side of the projection station 20. However, even in this case, the UAV 10 includes the camera 11 and the control unit 13 as shown in FIG. 6.

Further, in a case where the projection station 20 also includes a camera as described above, the camera of the projection station 20 may capture an image of the surface of the building in advance, and generate a camera image. In accordance with the camera image, the path derivation unit 24 may detect, from the surface of the building, a region that is not exposed to direct sunlight and has a shadow (not the shadow of the UAV 10), or a cracked region. The path derivation unit 24 may then set an information image projection portion in an uncracked region in the region that has a shadow.

According to this exemplary embodiment, even in a case where the surface of the building reflects only light of a specific wavelength, the camera 11 can generate a camera image that shows an information image. The information image projected onto the surface of the building can also be prevented from being buried in ambient light. Thus, the information image in the camera image can be easily detected.

The projector 21 may also be a projector (a laser projector, for example) having light sources that emit only light of predetermined wavelengths for the respective colors of red, green, and blue, for example. The projector control unit 22 may correct the color of an information image by switching the light sources of the projector 21, in accordance with color information sent from the control unit 13 of the UAV 10. In such a configuration, the wavelength of the light to be emitted from the selected light source is limited to a predetermined wavelength. Thus, even in an environment exposed to sunlight, the camera 11 of the UAV 10 can obtain a camera image that clearly shows an information image.

Further, the camera 11 of the UAV 10 may be provided with a filter that transmits only light of a predetermined wavelength, and can switch the wavelength of the light to be transmitted. For example, the wavelength of the light to be transmitted by the filter may be determined in accordance with each light source of the projector 21. For example, the filter of the camera 11 is a filter that can switch to a state where only light of the wavelength corresponding to the red light source of the projector 21 is transmitted, a state where only light of the wavelength corresponding to the green light source of the projector 21 is transmitted, or a state where only light of the wavelength corresponding to the blue light source of the projector 21 is transmitted. For example, in a case where the projection station 20 is notified of information indicating red, the control unit 13 switches the filter of the camera 11 to a state where only light of the wavelength corresponding to the red light source of the projector 21 is transmitted. Likewise, in a case where the projection station 20 is notified of information indicating green, the control unit 13 switches the filter of the camera 11 to a state where only light of the wavelength corresponding to the green light source of the projector 21 is transmitted. Likewise, in a case where the projection station 20 is notified of information indicating blue, the control unit 13 switches the filter of the camera 11 to a state where only light of the wavelength corresponding to the blue light source of the projector 21 is transmitted. As the camera 11 is provided with the above filter, it is possible to further increase the effect to obtain a camera image clearly showing an information image with the camera 11, even in an environment exposed to sunlight. Note that the filter of the camera 11 is not limited to any particular form. For example, in a conventional color camera, an R/G/B filter of Bayer arrangement is provided in each pixel. Only the light from the corresponding light source may be used through this filter. That is, if only the green light source is used, only the green pixels may be used. Likewise, if a light source of some other color is used, only the pixels corresponding to the light source may be used. Alternatively, a combination of a monochrome camera and an externally attached replaceable color filter may be used. Further, the above described filter may not be provided in the camera 11.

In a case where the color of the surface of the building is known and is a single color, the projector 21 may be provided with one light source that emits only light of the predetermined wavelength corresponding to the color. In this case, the camera 11 may also be provided with a filter that transmits only light having the wavelength corresponding to the light source. That is, in a case where the color of the surface of the building is known and is a single color, the light source of the projector 21 and the filter of the camera 11 may not be switchable. As already mentioned, the camera 11 is not necessarily provided with a filter.

Further, in a case where ambient light is strong relative to the brightness of the projector, or particularly in an environment exposed to direct sunlight, it is even more preferable to use a light source having a small wavelength width, such as a laser, in the projector 21 of the projection station 20, and attach a narrowband filter that transmits only light of the wavelength, to the UAV 10. Sunlight includes light that is emitted over a wide wavelength range, and a conventional camera outputs an integrated values of light over the wide wavelength range as brightness. However, if a narrowband filter is attached to the UAV 10, the sunlight component is narrowed to the transparency range of this filter, and accordingly, the detected value of the sunlight component becomes lower. On the other hand, laser beams are not affected by any narrowband filter. Accordingly, where a laser light source and a narrowband filter compatible with the laser light source are used, the influence of an external disturbance light can be reduced.

Seventh Exemplary Embodiment

A seventh exemplary embodiment of the present invention concerns an operation to be performed in a case where the information image projection plane is different from the surface to be imaged for state inspection.

Figure 16:
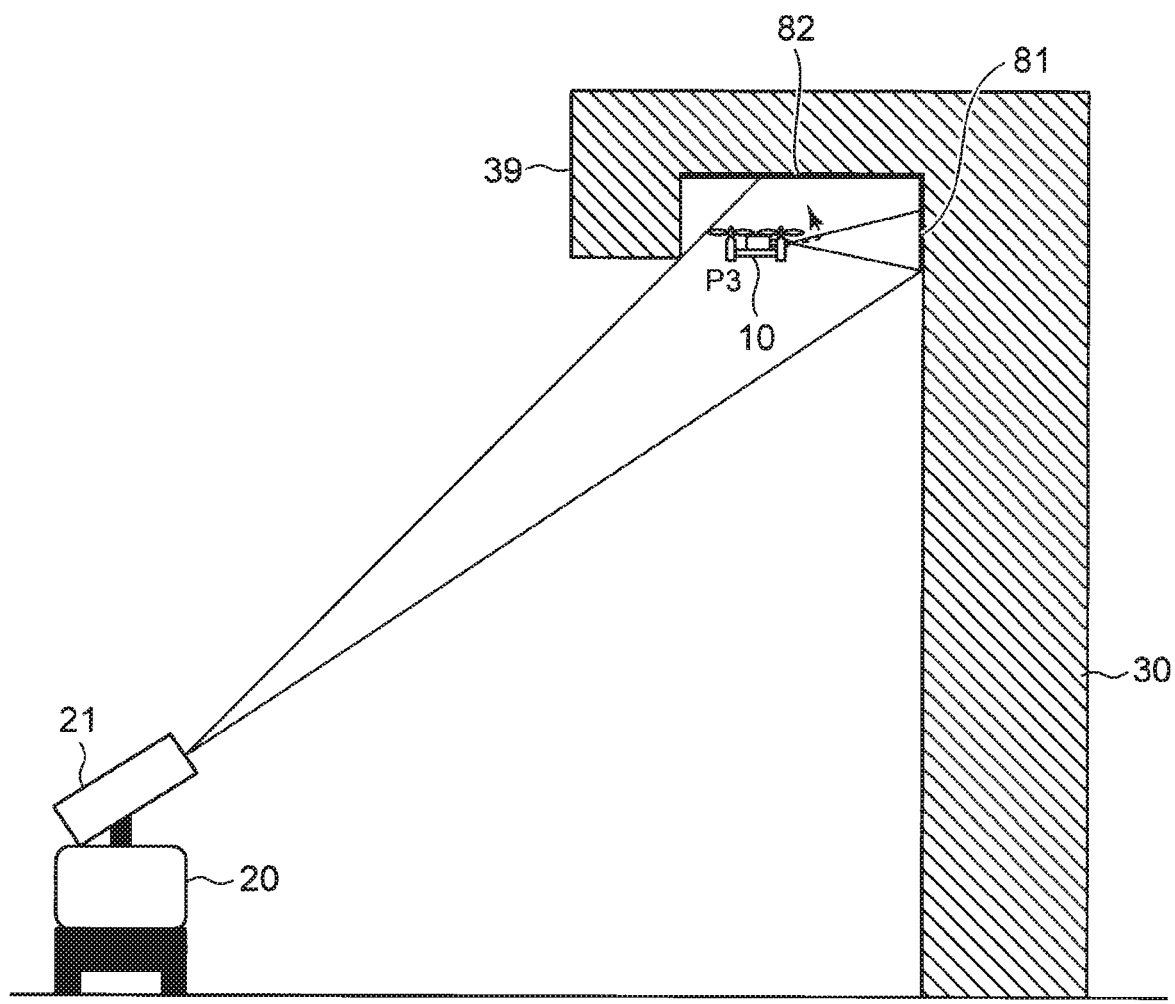
FIG. 16 It depicts a schematic diagram showing an example situation where an information image projection plane is different from the surface to be imaged for state inspection.

FIG. 16 is a schematic diagram showing an example situation where the information image projection plane is different from the surface to be imaged for state inspection. The region to be imaged for state inspection is a region 82, for example. However, the region 82 is horizontal. In addition to that, the region 82 includes a region that is a blind spot when viewed from the projector 21, due to a structure 39 of a building 30. Further, any information image cannot be projected onto a region that is a blind spot when viewed from the projector 21. Even if the projector 21 projects an information image onto a region that is not a blind spot in the region 82 when viewed from the projector 21, the UAV 10 might not be able to capture an image of the information image projected onto the horizontal region 82.

In such a situation, the information image projection plane and the surface to be imaged for state inspection should be different.

A region 81 is a region including an information image projection portion. The projector 21 projects an information image (this information image will be hereinafter referred to as the information image Q) onto the region 81. When generating the information image Q, the information image generation unit 25 (see FIG. 10) of the projector 21 incorporates the contents of control on the orientation of the camera during a stay in the air, as well as the contents of control on the orientation of the camera during movement, into the information image Q. In this example, the information image generation unit 25 incorporates the control contents for directing the orientation of the camera vertically upward during a stay in the air, into the information image Q.

In accordance with the information image immediately before the information image Q, the UAV 10 moves toward a target position P3, and then carries out steps B1 through B3 (see FIG. 11). If an information image is recognized in the camera image, the UAV 10 performs the operations in and after step B4.

In step B6, the control unit 13 (see FIG. 6) of the UAV 10 causes the UAV 10 to stay in the air at the spot, in accordance with the information image Q. The control unit 13 further directs the orientation of the camera vertically upward during the stay, in accordance with the control contents included in the information image Q. While staying in the air in this state, the control unit 13 performs imaging for state inspection. Since the camera 11 faces vertically upward at this point of time, an image of the region 82 to be inspected can be captured, and a camera image of the region 82 can be generated.

According to this exemplary embodiment, even if any information image cannot be projected onto the surface to be imaged for state inspection, the information image Q projected onto some other surface can be used to reach the vicinity of the target position. In accordance with the control contents included in the information image Q, the UAV 10 can change the camera direction during a stay in the air, capture an image of the surface to be imaged for state inspection, and can generate a camera image of the surface.

Eighth Exemplary Embodiment

Due to age-related deterioration of a building, fasteners such as bolts used in the building become loose, cavities are formed inside the building, or defects such as cracking and peeling of the surface structural material or deterioration and rust of the paint are caused in some cases. Because of these defects, deformation such as cracks or steps might be caused in a surface which was originally a uniform surface. An unmanned flying device control system of an eighth exemplary embodiment of the present invention detects such deformation of the surface (specifically, discontinuous portions in the surface), and controls the UAV by taking into account the detection results.

First, the unmanned flying device control system detects the presence and the position of surface deformation. The unmanned flying device control system then measures the three-dimensional shape of the surface, to determine the influence of the surface deformation on information images. Lastly, in accordance with the surface deformation, the unmanned flying device control system controls information image projection so that any projected information image is not distorted. The unmanned flying device control system according to the eighth exemplary embodiment of the present invention also performs these operations in accordance with the vibration of the building, and measures not only deformation of the building surface but also the vibration state by examining differences.

In the eighth exemplary embodiment of the present invention, the projector 21 projects an image showing a predetermined shape (this image will be hereinafter referred to as the pattern image) onto a surface of a building. The control unit 13 of the UAV 10 detects the state of deformation of the surface of the building, in accordance with the shape of the pattern shown in the camera image. The projection station 20 controls information image projection, in accordance with the state of deformation.

This aspect is described below in greater detail. First, to detect the presence of deformation such as cracking or bulging of the surface, the projector 21 projects the pattern image onto the surface of the building. The pattern image may be an image showing a mesh pattern, for example. Alternatively, the pattern image may be uniform single-color light. In the case of a mesh pattern, a rough mesh is first projected, and the entire pattern is detected. If deformation is detected, a finer mesh is projected onto the site of the deformation, and a specific position may be again detected. Instead of a dedicated shape, an information image may also be used as the pattern image. In either case, after the information image generation unit 25 generates the pattern image, the projection station 20 notifies the UAV 10 of the shape of the pattern image.

After the pattern image is projected onto the surface of the building, the camera 11 of the UAV 10 captures an image of the pattern image. The control unit 13 then compares the image captured by the camera 11 with the pattern image generated by the information image generation unit 25, and recognizes a difference at a portion as deformation of the surface. That is, in a case where the surface of the building is a uniform surface, an image of the pattern image intended by the information image generation unit 25 of the projector 21 is captured by the camera 11 of the UAV 10. However, if the surface has deformation such as cracks or steps, the pattern image is divided or has a shadow at the position of the deformation of the surface, and thus, the deformation is detected. That is, the control unit 13 functions as a deformation determination unit that determines deformation of the projection plane of an object, in accordance with the shape of an captured image formed by capturing an image of a projected pattern image. As described in the first exemplary embodiment, the UAV 10 is not necessarily able to perform imaging at a target position. Therefore, a captured image as a whole is deformed, depending on deviation from the target position. However, this whole deformation can be determined from the pattern image. Thus, it is possible to compare the pattern image generated by the information image generation unit 25 with the image captured by the camera 11 of the UAV 10.

It is desirable that the orientation of the optical axis and the light beams of the projector 21 does not coincide with the orientation of the camera 11 of the UAV 10. Deformation or a shadow in the pattern image formed at a groove portion or a step portion of the surface of the building can be checked in a case where the pattern image is observed closely from a different direction from the light of the projector 21. Therefore, to observe deformation or a shadow in the pattern image, the orientation of the field of view of the camera 11 should not coincide with the orientation of the projector 21.

When the control unit 13 of the UAV 10 recognizes the pattern image projected onto a building, it is more preferable for the control unit 13 to control the position of the UAV 10 and the orientation of the camera 11 so that the imaging direction varies, with the pattern image being the center. This is because the appearance of deformation or a shadow in the pattern image varies depending on the direction of the light source and the orientation of the camera, and there is a direction from which deformation or a shadow can be easily seen. Images captured at various positions and in various orientations may be compared, and be combined so that deformation or a shadow becomes clear. That is, the control unit 13 controls the camera 11 to capture images of the pattern image from different fields of view. The control unit 13 functioning as a deformation determination unit also determines deformation of the projection plane, in accordance with the shapes of the respective images captured from the different fields of view.

Further, the control unit 13 of the UAV 10 synchronizes with the projector 21 through communication, a timer, or the like. It is more preferable for the control unit 13 to cause the camera 11 to capture an image when there is the pattern image and capture an image when there is no pattern image, compare the images with each other, and extract deformation or a shadow portion from the pattern image. In a case where there is no pattern image, the building surface is illuminated with ambient light such as sunlight, and the camera 11 captures an image of the illuminated building surface. However, ambient light has many random components in terms of orientation. Therefore, deformation or a shadow is not easily generated, and the boundary is blurred in some cases. On the other hand, light of the projector 21 is almost constant, and deformation or a shadow in the pattern image is easily generated. In a case where the building surface has a pattern, instead of deformation or a shadow in the pattern image due to deformation of the surface, an image of the pattern is captured, regardless of the existence/absence of the pattern image. Where these images are compared, only the pattern image and a shadow can be more clearly recognized. In other words, the control unit 13 determines deformation of the projection plane, in accordance with the difference between the captured image of the projection plane in a case where the pattern image is projected onto the projection plane of the object, and the captured image of the projection plane in a case where the pattern image is not projected onto the projection plane of the object.

Figure 17:
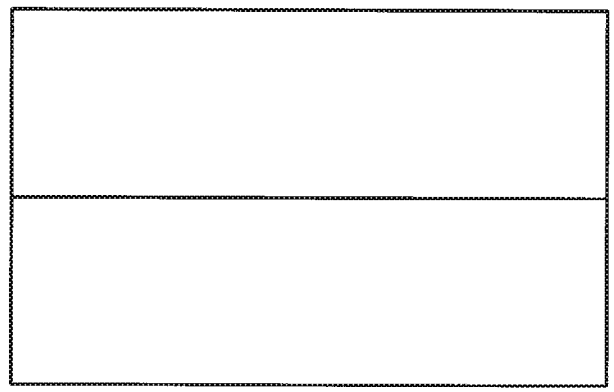
FIG. 17 It depicts a schematic diagram showing an example of a pattern image showing a horizontal straight line.

Next, to determine the influence of the deformation of the surface on an information image, the three-dimensional shape of the surface is measured. Note that, for ease of explanation, a horizontal straight line will be described as an example of a predetermined pattern in this exemplary embodiment. FIG. 17 is a schematic diagram showing an example of a pattern image showing a horizontal straight line. In FIG. 17, a pattern image showing one straight line is shown, but more than one straight line or figures may be shown in the pattern image.

Figure 18:
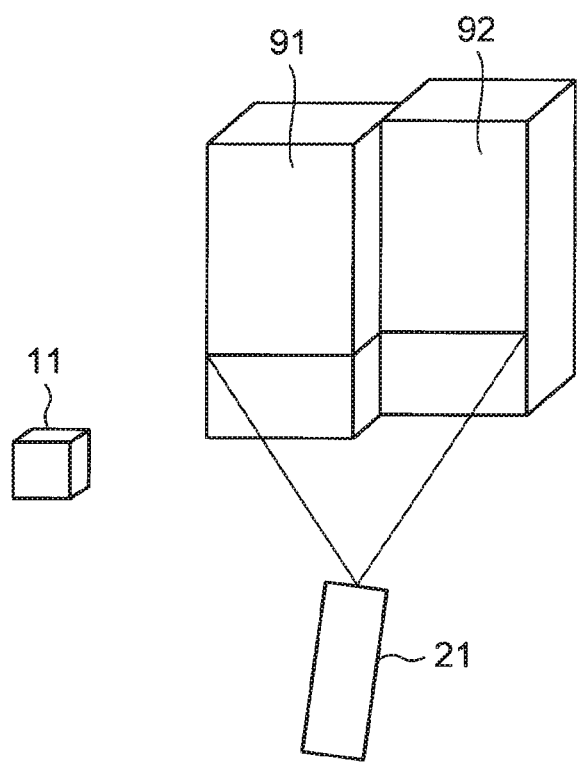
FIG. 18 It depicts a schematic diagram showing a state in which pattern image is projected onto a surface of a building having a step, and the camera is capturing an image of the projection portion.
Figure 19:
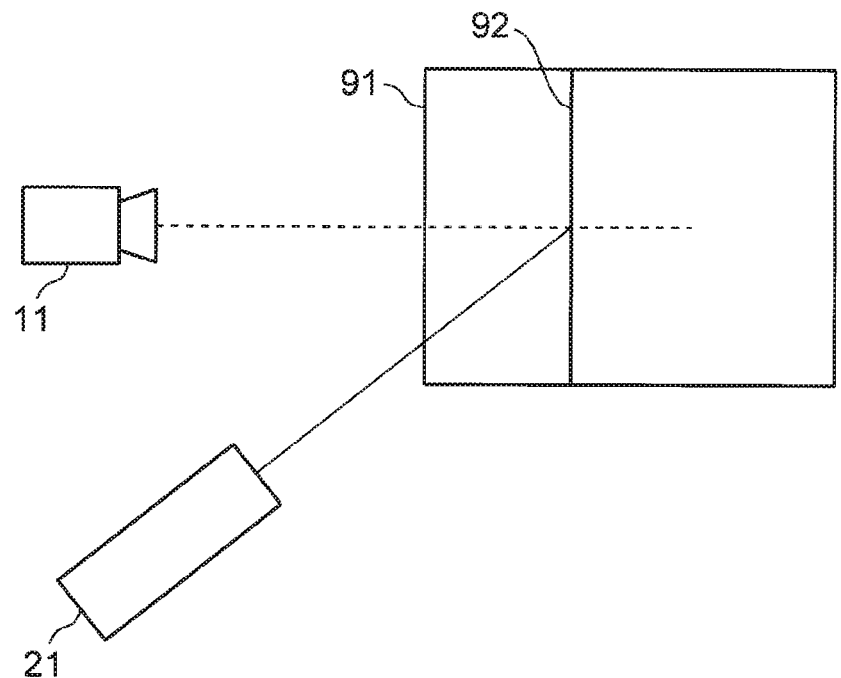
FIG. 19 It depicts a schematic side view of the state shown in FIG. 18.

FIG. 18 is a schematic diagram showing a state in which the pattern image is projected onto a surface of a building having a step formed due to age-related deterioration, and the camera 11 of the UAV 10 is capturing an image of the projection portion. FIG. 19 is a schematic side view of the state shown in FIG. 18. In the example shown in FIGS. 18 and 19, a surface 91 of the building is bulging from a surface 92, and a step is formed.

Figure 20:
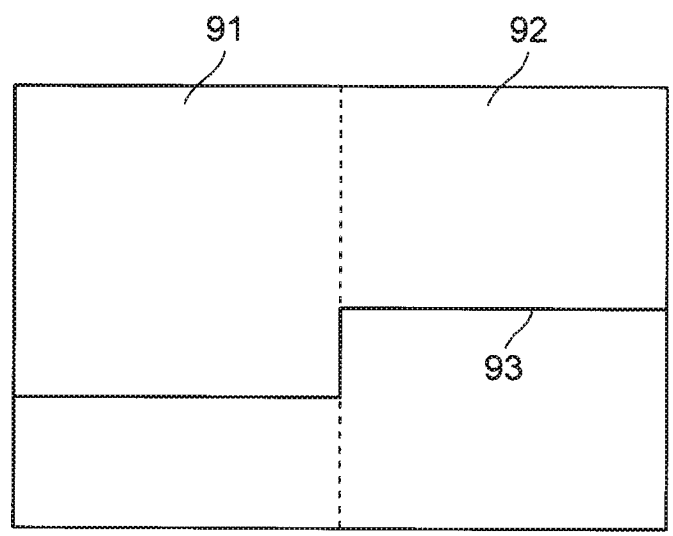
FIG. 20 It depicts a schematic diagram showing an example of a camera image obtained as a result of imaging of a pattern image.

The camera 11 captures an image of the surface 91 and the surface 92 onto which the pattern image (the horizontal straight line) is projected, and generates a camera image. FIG. 20 is a schematic diagram showing an example of a camera image obtained as a result of imaging of the pattern image. In the camera image shown in FIG. 20, the surfaces 91 and 92 and a line 93 are shown. The projector 21 projects a horizontal straight line onto the surfaces 91 and 92, but, due to the step between the surfaces 91 and 92, the horizontal straight line is shown as the curved line 93 in the camera image.

Further, the projection station 20 transmits the angle between the projection direction of the pattern image and the wall surface to the UAV 10. The projection station 20 may transmit this angle to the UAV 10 through communication. Alternatively, the projection station 20 may project an information image including information about the angle, and the control unit 13 of the UAV 10 may recognize the information about the angle through the information image in the camera image.

In the case described with reference to FIGS. 18 through 20, the pattern image is a single straight line, and this straight line is located at the position of the optical axis. That is, the projection direction coincides with the light direction of the pattern image. However, the light direction of the pattern image does not coincide with the optical axis in some cases. For example, in a case where a pattern image showing one straight line is displayed at the upper end of the projection range, the light direction of the pattern image deviates from the projection direction and the optical axis direction. Therefore, it is more preferable for the projection station 20 to convert the position of the pattern image in the projection range of the projector 21 into an angle, add the converted angle to the angle between the projection direction of the pattern image and the wall surface, and transmit the resultant value to the UAV 10. That is, the control unit 13 determines deformation of the projection plane, in accordance with the relationship between the projection direction of the pattern image and the light direction in each of the pixels constituting the pattern image, and the captured image formed by capturing an image of the pattern image.

The control unit 13 of the UAV 10 recognizes the shape of the pattern (the line 93 in this example) that is shown in the camera image. The control unit 13 determines the state of the surface of the building, from the shape of the pattern shown in the camera image. In this example, from the shape of the line 93 shown in the camera image, the control unit 13 determines that there is a step between the surface 91 and the surface 92. That is, the control unit 13 detects the size of the step between the surface 91 and the surface 92, and the position where the step is formed. For example, the control unit 13 stores beforehand the correspondence relationship between the angle between the projection direction of the pattern image and the wall surface, and deformation of the shape of the pattern in the camera image. The control unit 13 may then determine the state of the surface of the building by detecting the state of the surface of the building corresponding to the deformation of the shape of the pattern in the camera image.

The control unit 13 transmits information about the state of the surface of the building (the information indicating the size of the step between the surface 91 and the surface 92, and the position where the step is formed) to the projection station 20.

The projector control unit 22 of the projection station 20 receives information about the state of the surface of the building from the control unit 13. In turn, the projector control unit 22 controls the information image projection, in accordance with the information stored in the data storage unit 23 about the external appearance of the building and the three-dimensional shape of the building, and the information received from the UAV 10 (the control unit 13) about the state of the surface of the building. Specifically, in a case where an information image is to be projected onto a position including deformation of the surface, for example, the projector control unit 22 projects an information image that is generated (corrected) by the information image generation unit 25 taking into account the deformation of the information image due to the deformation of the surface, onto the surface of the building. That is, in a case where it is determined the projection plane is deformed, the projector control unit 22 generates and projects an image for controlling operation of the unmanned flying device in accordance with the influence of the deformation.

Alternatively, the projector control unit 22 may project an information image onto a position where the surface is not deformed, for example. That is, in a case where it is determined the projection plane is deformed, the projector control unit 22 projects an image for controlling operation of the unmanned flying device onto a position other than the position having the deformation.

According to this exemplary embodiment, the control unit 13 can detect deformation caused due to age-related deterioration or the like in a surface of a building, and the size of the deformation. Further, as the control unit 13 transmits information about the state of the surface of the building to the projection station 20, the projection station 20 (the projector control unit 22) can correct the information image so that the projected information image will not be distorted, or project the information image onto a position other than the position of deformation. Thus, the projection station 20 can project the information image onto the surface of the building in a preferred state, and it is possible to further increase the accuracy in guiding the UAV 10. That is, according to the eighth exemplary embodiment of the present invention, in a case where an image for controlling operation of an unmanned flying device is projected onto the object, and the unmanned flying device is guided to the vicinity of the target position near the object, it is possible to control the unmanned flying device by taking into consideration the state of the image projection plane of the object.

Next, an example application of the eighth exemplary embodiment is described.

Buildings are rigid, but, in some cases, they vibrate due to external factors such as wind, sound waves, or continuous or discontinuous stresses. As for this vibration, the respective portions of a building vibrate independently of one another, with the discontinuous plane in the surface being the boundary. From information about the independent vibration, it is possible to estimate the degree of deterioration of the building. In view of this, an application of this exemplary embodiment discloses a technique of detecting the difference in vibration between a step or discontinuous portion of the surface and the other portion of the surface, and using the difference in estimating the state of deterioration of the building. At the same time, this technique can be applied in cases where a building is vibrating as described below, though the above described exemplary embodiment concerns a method of detecting deformation of a surface in a case where the building is not vibrating.

In the above described exemplary embodiment, FIG. 18 is a schematic diagram showing a state in which the pattern image is projected onto a surface of a building having a step or a discontinuous surface formed due to age-related deterioration, and the camera 11 of the UAV 10 is capturing an image of the projection portion. FIG. 19 is a schematic cross-sectional view of the state shown in FIG. 18. FIG. 20 is a schematic diagram showing an example of a camera image obtained as a result of imaging of the pattern image. In FIGS. 18 through 20, the projector 21 is projecting a horizontal straight line. However, since the surfaces 91 and 92 have different depths as viewed from the projector 21, the pattern image viewed from the camera 11 is the curved line 93.

Here, a case where the surface 92 vibrates in such a direction as to repeatedly move closer to and away from the surface 91 is described. When the surface 92 is moving away, the camera 11 captures an image of the curved line 93, as in FIGS. 18 and 19. However, when the surface 92 moves to the surface 91, and the surface 92 and the surface 91 supposedly become continuous, the distance to the surface 92 and the surface 91 from the projector 21 are the same. Therefore, when viewed from the camera 11, the surface 91 and the surface 92 are equivalent to one continuous surface, and an image of the pattern image is captured as a single straight line by the camera 11. Further, in a case where the surface 92 is located in the middle position, the curved portion of the pattern image is captured as a small portion by the camera 11.

Accordingly, the camera 11 captures images of the pattern image at the same discontinuous or step portion in the surface at different imaging times, and the control unit 13 compares the images with each other, so that the vibration states of the respective projection portions can be measured. That is, a vibrating position difference is the amplitude of the vibration of the building in the direction of the optical axis of the camera 11. It is also possible to calculate the vibration period from the time intervals at which the pattern image appears at the same portion. An information image is then projected in accordance with this vibration state, so that flight control can be performed with higher precision. For example, if an information image is selectively projected onto a surface with little or no vibration, the influence of vibration can be ignored. Further, in a case where it is necessary to project an information image onto a surface with large vibration, for example, the information image generation unit 25 generates the information image by taking into consideration the target position error due to the vibration, so that the influence of the vibration can be reduced.

Specifically, the control unit 13 controls the camera 11 so that the camera 11 captures images of a deformed projection plane at different times. The control unit 13 functioning as a deformation determination unit also acquires the vibration state of the projection plane, in accordance with the images captured at the different timings. In accordance with the acquired vibration state, the projection station 20 controls the projection of the image for controlling the operation of the unmanned flying device.

Meanwhile, the vibration period of a building is short relative to the shutter speed of the camera 11 or the imaging intervals in a continuous imaging operation. That is, when viewed from the camera 11, the pattern image of the vibrating portion is moving at a high speed. Therefore, motion blur (object blur) occurs in captured pattern images. In view of this, it is possible to measure the state of vibration of the projection portion from the degree of blurring in an image generated by the camera 11 capturing the pattern image projected onto a surface having a discontinuous or step portion, instead of comparing images captured at different imaging times. That is, a vibration state can be measured from one image. Specifically, the control unit 13 functioning as a deformation determination unit acquires the vibration state of the projection plane, in accordance with the degree of blurring in a captured image of the projection plane. In accordance with the acquired vibration state, the projection station 20 controls the projection of the image for controlling the operation of the unmanned flying device.

Note that, in the above description, an example method of measuring a surface state has been described as post-processing in a case where the position of deformation in a surface of a building is known. However, the example application of this exemplary embodiment can also be used for searching the position of deformation in a surface. Specifically, to detect the presence of cracking or bulging or the like of a surface, the projector 21 projects the pattern image onto a surface of a building. The camera 11 of the UAV 10 then captures an image of this pattern image, but blurring has occurred in the pattern image at the vibrating portion. Therefore, the camera 11 of the UAV 10 captures an image of the pattern image, and the control unit 13 analyzes the captured image, to detect the blurred portion. In this manner, the position and the characteristics of the deformation in the surface can be measured. Once the position and the characteristics of the deformation become apparent, internal defects and overall deterioration can be more accurately estimated in accordance with the design and the structure of the building, the results of observation of other construction conditions not disclosed in the present invention, and the like.

In the case described as a specific example in the eighth exemplary embodiment, the control unit 13 of the UAV 10 functions as a deformation determination unit. However, this is merely an example, and the projection station 20 or some other device may function as a deformation determination unit. In this case, the projection station 20 or some other device acquires a captured image of the pattern image from the control unit 13 of the UAV 10, and determines deformation of the projection plane from the shape of the acquired captured image. Alternatively, a deformation inspection device including the projection station 20 and the deformation determination unit according to the eighth exemplary embodiment may be formed.

Each of the exemplary embodiments of the present invention can be applied not only in infrastructure deterioration diagnosis but also in cases where an UAV is controlled to patrol and monitor buildings, and the like.

Figure 21:
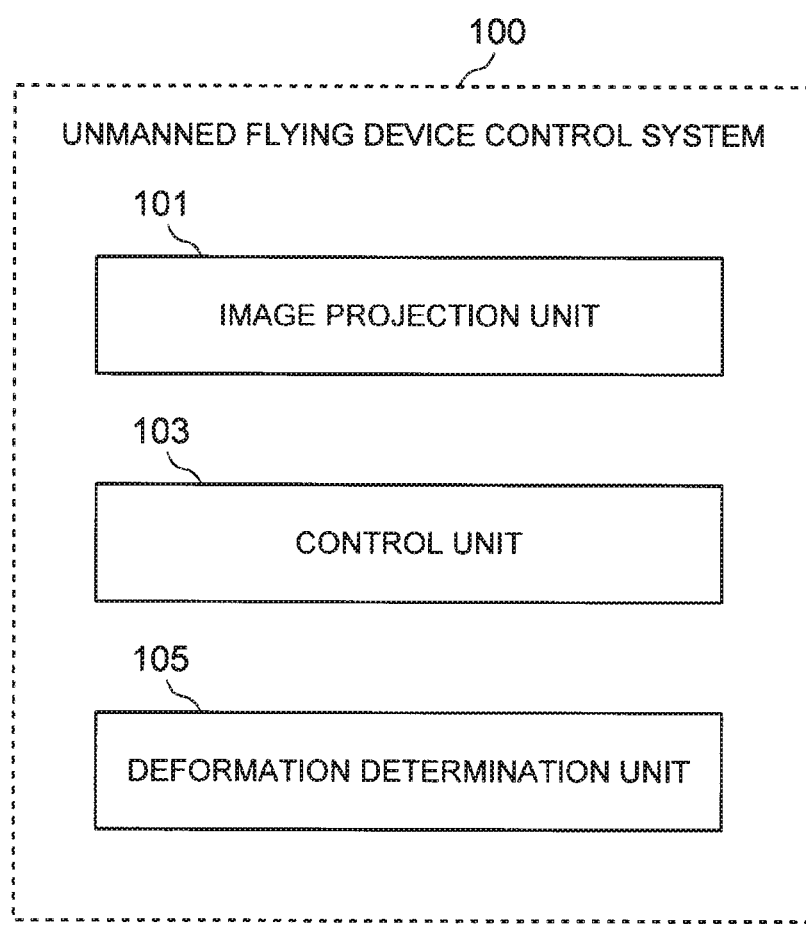
FIG. 21 It depicts a schematic diagram showing the outline of an unmanned flying device control system of the present invention.

Next, the outline of the present invention is described. FIG. 21 is a schematic diagram showing the outline of an unmanned flying device control system of the present invention. An unmanned flying device control system 100 includes an image projection unit 101, a control unit 103, and a deformation determination unit 105.

The image projection unit 101 (the projection station 20, for example) projects an image (an information image, for example) for controlling an unmanned flying device (the UAV 10, for example) equipped with an imaging device (the camera 11, for example), onto an object (a building to be subjected to state inspection, for example). The image projection unit 101 also projects an image (a pattern image, for example) showing a predetermined shape onto the object, and controls the projection of the image for controlling operation of the unmanned flying device, in accordance with a result of deformation determination performed by the later described deformation determination unit 105.

The control unit 103 (the control unit 13, for example) controls the operation of the unmanned flying device, in accordance with identification information indicated by an image captured by the imaging device.

The deformation determination unit 105 determines deformation of the projection plane of the object. Specifically, the deformation determination unit 105 determines deformation of the projection plane, from the shape of a captured image generated by capturing an image of the projected image showing a predetermined shape.

With such a configuration, in a case where an image for controlling operation of an unmanned flying device is projected onto the object, and the unmanned flying device is guided to the vicinity of the target position near the object, it is possible to control the unmanned flying device by taking into consideration the state of the image projection plane of the object.

Although the present invention has been described with reference to the exemplary embodiments, the present invention is not limited to the above exemplary embodiments. Various changes that can be understood by those skilled in the art within the scope of the present invention can be made to the configuration and details of the present invention.

INDUSTRIAL APPLICABILITY

The present invention is suitably applied to an unmanned flying device control system that controls an unmanned flying device.

REFERENCE SIGNS LIST

10 Unmanned aerial vehicle (UAV)
11 Camera
13 Control unit
15 Camera angle control unit
16 Motor driver
17a to 17d Motor
18 Communication unit
20 Projection Station
21 Projector
22 Projector control unit
23 23 Data storage unit
24 Path derivation unit
25 Information image generation unit
27 Communication unit

The invention claimed is:

1. An unmanned flying device control system comprising:
an image projection unit that projects an image onto an object, the image being designed for controlling operation of an unmanned flying device equipped with an imaging device;
a control unit that controls operation of the unmanned flying device, in accordance with the image captured by the imaging device; and
a deformation determination unit that determines deformation of a projection plane of the object,
wherein the image projection unit
projects an image showing a predetermined shape onto the object, and
controls projection of the image for controlling operation of the unmanned flying device, in accordance with a result of the deformation determination, and the deformation determination unit determines deformation of the projection plane, in accordance with a shape of a captured image generated by capturing the projected image showing the predetermined shape.

2. The unmanned flying device control system according to claim 1, wherein
the control unit controls the imaging device to capture the image showing the predetermined shape from different fields of view, and
the deformation determination unit determines deformation of the projection plane, in accordance with shapes of a plurality of captured images captured from the different fields of view.

3. The unmanned flying device control system according to claim 1, wherein
the deformation determination unit determines deformation of the projection plane, in accordance with a difference between a captured image of the projection plane captured when the image showing the predetermined shape is projected onto the projection plane of the object, and a captured image of the projection plane captured when the image showing the predetermined shape is not projected onto the projection plane of the object.

4. The unmanned flying device control system according to claim 1, wherein,
when it is determined that there is deformation in the projection plane, the image projection unit projects the image for controlling operation of the unmanned flying device onto a position other than a position of the deformation.

5. The unmanned flying device control system according to claim 1, wherein,
when it is determined that there is deformation in the projection plane, the image projection unit generates and projects the image for controlling operation of the unmanned flying device, in accordance with influence of the deformation.

6. The unmanned flying device control system according to claim 1, wherein
the deformation determination unit determines deformation of the projection plane, in accordance with a relationship between a projection direction of the image showing the predetermined shape and a light direction in each of images constituting the image, and a captured image generated by capturing the image.

7. The unmanned flying device control system according to claim 1, wherein
the control unit controls the imaging device to capture a projection plane having deformation at different times,
the deformation determination unit obtains a vibration state of the projection plane, in accordance with a plurality of captured images obtained at the different times, and
the image projection unit controls projection of the image for controlling operation of the unmanned flying device, in accordance with the obtained vibration state.

8. The unmanned flying device control system according to claim 1, wherein
the deformation determination unit obtains a vibration state of the projection plane, in accordance with a degree of blurring in a captured image of the projection plane, and
the image projection unit controls projection of the image for controlling operation of the unmanned flying device, in accordance with the obtained vibration state.

9. An unmanned flying device control method comprising:
projecting an image showing a predetermined shape onto an object;
determining deformation of a projection plane, in accordance with a shape of a captured image generated by capturing the projected image showing the predetermined shape;
controlling projection of an image for controlling operation of an unmanned flying device equipped with an imaging device, in accordance with a result of the deformation determination;
projecting the image for controlling operation of the unmanned flying device onto the object; and
controlling operation of the unmanned flying device, in accordance with the image captured by the imaging device.

10. An inspection device which inspects deformation of an object, comprising:
an image projection unit that projects onto the object an image showing a predetermined shape and an image by which an unmanned flying device equipped with an imaging device is controlled; and
a deformation determination unit that determines deformation of a projection plane of the object, in accordance with a shape of a captured image generated by the imaging device capturing the projected image showing the predetermined shape.

* * * * *